US006849706B1

(12) United States Patent
Brunelle et al.

(10) Patent No.: US 6,849,706 B1
(45) Date of Patent: Feb. 1, 2005

(54) COPOLYETHERIMIDES

(75) Inventors: Daniel Joseph Brunelle, Burnt Hills, NY (US); Havva Yagci Acar, Clifton Park, NY (US); Farid Fouad Khouri, Clifton Park, NY (US); William David Richards, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/647,888

(22) Filed: Aug. 25, 2003

(51) Int. Cl.⁷ .............................................. C08G 73/00
(52) U.S. Cl. ..................... 528/170; 528/125; 528/126; 528/128; 528/171; 528/172; 528/173; 528/174; 528/176; 528/179; 528/183; 528/185; 528/188; 528/220; 528/229; 528/350; 528/351; 528/352; 525/420; 525/432; 525/436; 525/439; 524/600; 524/606
(58) Field of Search ............................. 528/125, 126, 528/128, 170–174, 176, 179, 183, 185, 188, 220, 229, 350, 351–353; 525/432, 436, 439, 420; 524/600, 606

(56) References Cited

U.S. PATENT DOCUMENTS

| | | | |
|---|---|---|---|
| 2,991,273 A | 7/1961 | Hechelhammer et al. | |
| 2,999,835 A | 9/1961 | Goldberg | |
| 3,028,365 A | 4/1962 | Schnell et al. | |
| 3,148,172 A | 9/1964 | Fox | |
| 3,271,367 A | 9/1966 | Schnell et al. | |
| 3,271,368 A | 9/1966 | Goldberg et al. | |
| 3,787,364 A | 1/1974 | Wirth et al. | |
| 3,847,867 A | 11/1974 | Heath et al. | |
| 3,847,869 A | 11/1974 | Williams, III | |
| 3,850,885 A | 11/1974 | Takekoshi et al. | |
| 3,852,242 A | 12/1974 | White | |
| 3,855,178 A | 12/1974 | White et al. | |
| 3,983,093 A | 9/1976 | Williams, III et al. | |
| 4,217,438 A | 8/1980 | Brunelle et al. | |
| 4,273,712 A | 6/1981 | Williams, III | |
| 4,460,778 A | 7/1984 | Brunelle | |
| 4,504,650 A | * 3/1985 | Cooper | 528/185 |
| 4,595,760 A | 6/1986 | Brunelle | |
| 4,675,376 A | * 6/1987 | Peters | 528/185 |
| 4,965,337 A | * 10/1990 | Peters et al. | 528/353 |
| 5,116,975 A | 5/1992 | Brunelle | |
| 5,132,423 A | 7/1992 | Brunelle et al. | |
| 5,229,482 A | 7/1993 | Brunelle | |
| 5,359,092 A | * 10/1994 | Hay et al. | 546/99 |
| 5,420,234 A | * 5/1995 | Hay et al. | 528/353 |
| 5,514,813 A | * 5/1996 | Brunelle | 548/462 |
| 5,663,275 A | * 9/1997 | Schmidhauser | 528/125 |
| 5,830,974 A | 11/1998 | Schmidhauser et al. | |
| 5,830,988 A | * 11/1998 | Chan | 528/353 |
| 5,856,422 A | * 1/1999 | Chan et al. | 528/125 |
| 5,908,915 A | * 6/1999 | Brunelle | 528/170 |
| 5,917,005 A | * 6/1999 | Brunelle et al. | 528/353 |
| 6,020,456 A | * 2/2000 | Brunelle et al. | 528/353 |
| 6,235,866 B1 | * 5/2001 | Khouri et al. | 528/125 |
| 6,265,521 B1 | * 7/2001 | Fyvie et al. | 528/170 |
| 6,498,224 B1 | * 12/2002 | Odle et al. | 528/170 |
| 6,500,904 B1 | * 12/2002 | Hayes | 525/419 |

OTHER PUBLICATIONS

"Synthesis and Properties of Designed Low–k Fluoro–Copolyetherimides. Part 1", bye Rohitkumar H. Vora et al, pp. 361–373, Advanced Functional Materials, Oct. 2001, 11, No. 5.*

DM White et al., "*Polyetherimides Via Nitro–Displacement Polymerization: Monomer Synthesis and* ¹³ *C–NMR Analysis of Monomers and Polymers*", Journal of Polymer Science: Polymer chemistry Edition, vol. 19, pp 1635–1658, 1981.

* cited by examiner

*Primary Examiner*—P. Hampton Hightower
(74) *Attorney, Agent, or Firm*—Andrew J. Caruso; Patrick K. Patnode

(57) ABSTRACT

Copolyetherimides comprise phthalimide structural units comprising both 3- and 4-linkages, wherein the designations 3-linkage and 4-linkage refer to the isomeric positions on the phthalimide ring in the totality of phthalimide-comprising structural units in the copolymer. The products have excellent properties, including high glass transition and heat distortion temperatures, high ductility and good melt flow properties, and low polydispersity.

73 Claims, No Drawings

COPOLYETHERIMIDES

BACKGROUND OF INVENTION

This invention relates to copolyetherimides, and more particularly to a new genus of copolyetherimides characterized by such advantageous properties as good ductility, good melt flow properties and high heat resistance.

Polyetherimides are a well-known class of commercially available polymers having excellent chemical resistance, high temperature stability and electrical and mechanical properties. An important subgenus of polyetherimides comprises polymers prepared by the reaction of diamines such as m-phenylenediamine with dianhydrides such as the dianhydride of 2,2-bis[4-3,4-dicarboxyphenoxy)phenyl]-propane. As disclosed, for example, in U.S. Pat. No. 5,229,482, such polyetherimides may also be prepared by the reaction, typically in the presence of a phase transfer catalyst, of a bisphenol alkali metal salt with a bis(chlorophthalimide) such as 1,3-bis[N-(4-chlorophthalimido)benzene]. The latter method has gained favor in recent years by reason of its relative simplicity (e.g., a minimum number of steps) and high yield.

Various properties of polyetherimides could benefit from improvement. They include melt flow; heat resistance, which is related to heat distortion temperature; and ductility, which can be measured by temperature at which the transition from the brittle to the ductile state occurs.

In White et at., J. Poly. Sci., Poly. Chem. Ed, 19, 1635–1658 (1981), there are disclosed certain polyetherimides prepared from 4,4'-diaminodiphenyl ether, also designated "ODA" (for 4,4'-oxydianiline). In a particular example, a mixture of the 3,3'-bis(nitrophthalimide) and the 4,4'-bis(nitrophthalimide) derived from ODA underwent reaction with resorcinol disodium salt to yield the corresponding copolyetherimide. There is no disclosure therein, however, of copolyetherimides of ODA and bisphenols or of copolyetherimides derived from 3,4'-bis(nitrophthalimide).

SUMMARY OF INVENTION

A genus of copolyetherimides has been discovered which is characterized by advantageous properties including high melt flow, high heat resistance and good ductility. A characteristic feature of these copolyetherimides is the presence therein of phthalimide structural units comprising both 3- and 4-linkages, wherein the designations 3-linkage and 4-linkage refer to the isomeric positions on the phthalimide ring in the totality of phthalimide-comprising structural units in the copolymer.

Accordingly, the invention includes in one embodiment copolyetherimides having a glass transition temperature of at least about 218° C., said copolyetherimides comprising structural units of the formulas (I) and (II):

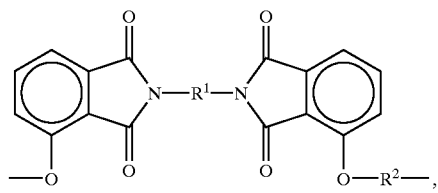

(I)

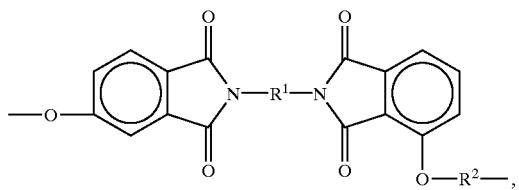

(II)

and optionally structural units of the formula (III):

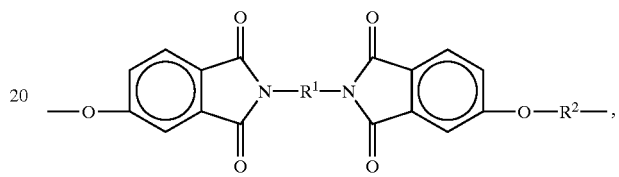

(III)

wherein $R^1$ comprises an unsubstituted $C_{6-22}$ divalent aromatic hydrocarbon or a substituted $C_{6-22}$ divalent aromatic hydrocarbon comprising halogen or alkyl substituents or mixtures of said substituents; or a divalent radical of the general formula (IV):

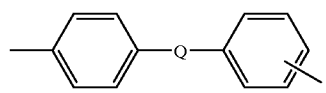

(IV)

wherein the unassigned positional isomer about the aromatic ring is either meta or para to Q, and Q is a covalent bond or a member selected from the group consisting of formulas (V):

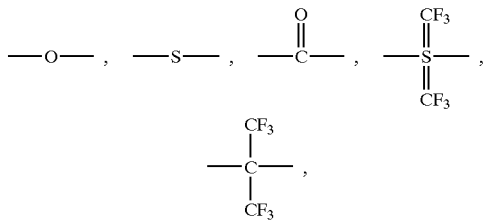

(V)

and an alkylene or alkylidene group of the formula $C_yH_{2y}$, wherein y is an integer from 1 to 5 inclusive, and $R^2$ is a divalent aromatic radical; the weight ratio of units of formula I to those of formula II being in the range of about 99.9:0.1 and about 25:75.

In another embodiment the invention includes copolyetherimides having a glass transition temperature of at least about 218° C., said copolyetherimides comprising structural units of the formulas (I) and (E):

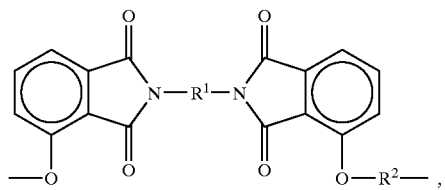

(I)

wherein R$^1$ is as defined hereinabove, and R$^2$ is derived from at least one dihydroxy-substituted aromatic hydrocarbon of the formula (VI):

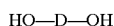

HO—D—OH (VI)

wherein D has the structure of formula (VII):

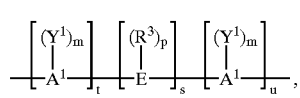

(VII)

wherein A$^1$ represents an aromatic group;

E comprises a sulfur-containing linkage, sulfide, sulfoxide, sulfone; a phosphorus-containing linkage, phosphinyl, phosphonyl; an ether linkage; a carbonyl group; a tertiary nitrogen group; a silicon-containing linkage; silane; siloxy; a cycloaliphatic group; cyclopentylidene, 3,3,5-trimethylcyclopentylidene, cyclohexylidene, 3,3-dimethylcyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene; an alkylene or alkylidene group, which group may optionally be part of one or more fused rings attached to one or more aromatic groups bearing one hydroxy substituent; an unsaturated alkylidene group; or two or more alkylene or alkylidene groups connected by a moiety different from alkylene or alkylidene and selected from the group consisting of an aromatic linkage, a tertiary nitrogen linkage; an ether linkage; a carbonyl linkage; a silicon-containing linkage, silane, siloxy; a sulfur-containing linkage, sulfide, sulfoxide, sulfone; a phosphorus-containing linkage, phosphinyl, and phosphonyl;

R$^3$ represents hydrogen; a monovalent hydrocarbon group, alkenyl, allyl, alkyl, aryl, aralkyl, alkaryl, or cycloalkyl;

Y$^1$ independently at each occurrence is selected from the group consisting of an inorganic atom, a halogen; an inorganic group, a nitro group; an organic group, a monovalent hydrocarbon group, alkenyl, allyl, alkyl, aryl, aralkyl, alkaryl, cycloalkyl, and an alkoxy group;

the letter "m" represents any integer from and including zero through the number of positions on A$^1$ available for substitution;

the letter "p" represents an integer from and including zero through the number of positions on E available for substitution;

the letter "t" represents an integer equal to at least one, the letter "s" represents an integer equal to either zero or one; and the letter "u" represents an integer equal to at least one, and wherein the weight ratio of units of formula I to those of formula III is in the range of between about 99.9:0.1 and about 10:90.

In another embodiment the invention includes copolyetherimides having a glass transition temperature of at least about 218° C., said copolyetherimides comprising structural units of the formulas (I) and (VIII):

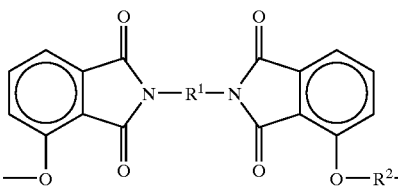

(I)

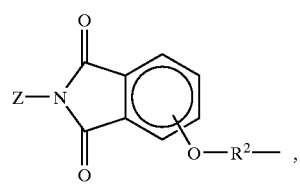

(VIII)

wherein the unassigned positional isomer about the aromatic phthalimide ring in formula (VIII) is in the 3- or 4-position, R$^1$ is as defined hereinabove, and R$^2$ is a divalent aromatic radical; wherein formula (VIII) is a terminal group with Z selected from the group consisting of unsubstituted and substituted alkyl, and unsubstituted and substituted aryl, and wherein the copolyetherimide has a weight average molecular weight, as determined by gel permeation chromatography relative to polystyrene standards, in the range of between about 30,000 and about 80,000, with a polydispersity in a range of between about 2.3 and about 3.

Various other features, aspects, and advantages of the present invention will become more apparent with reference to the following description and appended claims.

DETAILED DESCRIPTION

In one embodiment the copolyetherimides of this invention comprise structural units of both of formulas (I) and (II), and optionally structural units of the formula (III). In a particular embodiment the copolyetherimides of this invention comprise structural units of all of formulas (I), (II), and (E). In another particular embodiment the copolyetherimides of this invention comprise structural units of formulas (I) and (II), but not structural units of formula (I). In another embodiment of this invention the copolyetherimides comprise structural units of formulas (I) and (III), but not structural units of formula (II). In still another embodiment of this invention the copolyetherimides comprise structural units of formulas (I) and (VIII).

In various embodiments of the invention R$^1$ in formulas (I), (II) and (III) is derived from a diamine selected from the group consisting of aromatic and heterocyclic diamines.

In other embodiments R$^1$ in formulas (I), (II) and (III) comprises a divalent organic radical selected from aromatic hydrocarbon radicals having 6 to about 22 carbon atoms and substituted derivatives thereof. In some particular embodiments suitable substituents include, but are not limited to, halogen groups or alkyl groups or mixtures thereof. In various embodiments said aromatic hydrocarbon radicals may be monocyclic, polycyclic or may comprise fused rings. In one particular embodiment the aromatic hydrocarbon is monocyclic or comprises fused rings.

In still other embodiments R$^1$ in formulas (I), (II) and (III) comprises divalent aromatic hydrocarbon radicals of the general formula (IV)

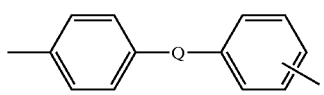
(IV)

wherein the unassigned positional isomer about the aromatic ring is either meta or para to Q, and Q is a covalent bond or a member selected from the group consisting of formulas (V):

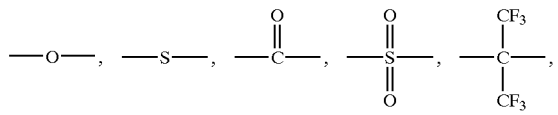
(V)

and an alkylene or alkylidene group of the formula $C_yH_{2y}$, wherein y is an integer from 1 to 5 inclusive. In some particular embodiments y has the value of one or two. Illustrative linking groups include, but are not limited to, methylene, ethylene, ethylidene, vinylidene, halogen-substituted vinylidene, and isopropylidene. In other particular embodiments the unassigned positional isomer about the aromatic ring in formula (IV) is para to Q.

In various embodiments the two amino groups in diamine-derived aromatic or heterocyclic hydrocarbon radicals are separated by at least two and sometimes by at least three ring carbon atoms. When the amino group or groups are located in different aromatic rings of a polycyclic aromatic moiety, they are often separated from the direct linkage or from the linking moiety between any two aromatic rings by at least two and sometimes by at least three ring carbon atoms. Illustrative non-limiting examples of aromatic hydrocarbon radicals include phenyl, biphenyl, naphthyl, bis(phenyl)methane, bis(phenyl)-2,2-propane, and their substituted derivatives. In particular embodiments substituents may include one or more halogen groups, such as fluoro, chloro, or bromo, or mixtures thereof; or one or more straight-chain-, branched-, or cycloalkyl groups having from 1 to 22 carbon atoms, such as methyl, ethyl, propyl, isopropyl, tert-butyl, or mixtures thereof. In particular embodiments substituents for aromatic hydrocarbon radicals, when present, are at least one of chloro, methyl, ethyl or mixtures thereof. In other particular embodiments said aromatic hydrocarbon radicals are unsubstituted. In some particular embodiments diamines from which $R^1$ may be derived include, but are not limited to, meta-phenylenediamine; para-phenylenediamine; mixtures of meta- and para-phenylenediamine; isomeric 2-methyl- and 5-methyl-4,6-diethyl-1,3-phenylene-diamines or their mixtures; bis(4-aminophenyl)-2,2-propane; bis(2-chloro-4-amino-3,5-diethylphenyl)methane, 4,4'-diaminodiphenyl, 3,4'-diaminodiphenyl, 4,4'-diaminodiphenyl ether, 3,4'-diaminodiphenyl ether, 4,4'-diaminodiphenyl sulfone, 3,4'4-diaminodiphenyl sulfone, 4,4'-diaminodiphenyl ketone, 3,4'-diaminodiphenyl ketone, and 2,4-toluenediamine. Mixtures of diamines may also be employed.

In one particular embodiment formula (I) comprises structural units which may be formally derived from 4,4'-diaminodiphenyl ether and at least one 3,3'-disubstituted dianhydride or from 3,4'-diaminodiphenyl ether and at least one 3,3'-disubstituted dianhydride or from at least one 3,3'-disubstituted dianhydride and mixtures of 4,4'-diaminodiphenyl ether and 3,4'-diaminodiphenyl ether. In another particular embodiment formula (II) comprises structural units which may be formally derived from 4,4'-diaminodiphenyl ether and at least one 3,4'-disubstituted dianhydride or from 3,4'-diaminodiphenyl ether and at least one 3,4'-disubstituted dianhydride or from at least one 3,4'-disubstituted dianhydride and mixtures of 4,4'-diaminodiphenyl ether and 3,4'-diaminodiphenyl ether. In another particular embodiment formula (H) comprises structural units which may be formally derived from 4,4'-diaminodiphenyl ether or 3,4'-diaminodiphenyl ether or a mixture thereof in combination with at least one 4,4'-disubstituted dianhydride. In still another particular embodiment formula (VIII) comprises structural units which may be formally derived from 4,4'-diaminodiphenyl ether or 3,4'-diaminodiphenyl ether or a mixture thereof in combination with at least one monosubstituted dianhydride which may be monosubstituted in the 3-position of one phthalimide ring or monosubstituted in the 4-position of one phthalimide ring.

In the embodiments of the invention wherein copolyetherimides comprise structural units of both of formulas (I) and (II) and optionally structural units of the formula (III) or wherein copolyetherimides comprise structural units of both of formulas (I) and (VIII), the $R^2$ radical may be any divalent aromatic radical. Suitable $R^2$ radicals include those derived from dihydroxy-substituted aromatic hydrocarbons. Suitable dihydroxy-substituted aromatic hydrocarbons include those represented by the formula (VI):

(VI)

wherein D is a divalent aromatic radical. In some embodiments, D has the structure of formula (VII):

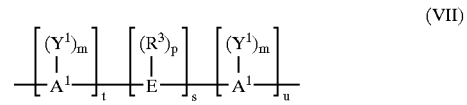
(VII)

wherein $A^1$ represents an aromatic group including, but not limited to, phenylene, biphenylene, naphthylene, etc. In some embodiments E may be an alkylene or alkylidene group including, but not limited to, methylene, ethylene, ethylidene, propylene, propylidene, isopropylidene, butylene, butylidene, isobutylidene, amylene, amylidene, isoamylidene, etc. In other embodiments when E is an alkylene or alkylidene group, it may also consist of two or more alkylene or alkylidene groups connected by a moiety different from alkylene or alkylidene, including, but not limited to, an aromatic linkage; a tertiary nitrogen linkage; an ether linkage; a carbonyl linkage; a silicon-containing linkage, silane, siloxy; or a sulfur-containing linkage including, but not limited to, sulfide, sulfoxide, sulfone, etc.; or a phosphorus-containing linkage including, but not limited to, phosphinyl, phosphonyl, etc. In other embodiments E may be a cycloaliphatic group including, but not limited to, cyclopentylidene, 3,3,5-trimethylcyclopentylidene, cyclohexylidene, 3,3-dimethylcyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, etc.; a sulfur-containing linkage, including, but not limited to, sulfide, sulfoxide or sulfone; a phosphorus-containing linkage, including, but not limited to, phosphinyl or phosphonyl; an ether linkage; a carbonyl group; a tertiary nitrogen group; or a silicon-containing linkage including, but not limited to, silane or siloxy. $R^3$ represents hydrogen or a monovalent hydrocarbon group including, but not limited to, alkenyl, allyl, alkyl, aryl, aralkyl, alkaryl, or cycloalkyl. In various embodiments a monovalent hydrocarbon group of $R^3$ may be halogen-substituted, particularly fluoro- or chloro-substituted, for example as in dichloroalkylidene, particularly gem-dichloroalkylidene. $Y^1$ independently at each occurrence may be an inorganic atom including, but not limited to, halogen (fluorine, bromine, chlorine, iodine); an inorganic group containing more than one inorganic atom including, but not limited to, nitro; an organic group including, but not limited to, a monovalent hydrocarbon group including, but not limited to, alkenyl, allyl, alkyl, aryl, aralkyl, alkaryl, or cycloalkyl, or an oxy group including, but not limited to, $OR^4$ wherein $R^4$ is a monovalent hydrocarbon group including, but not limited to, alkyl, aryl, aralkyl, alkaryl, or cycloalkyl; it being only necessary that $y^1$ be inert to and unaffected by the reactants and reaction conditions used to prepare the polymer. In some particular embodiments $Y^1$ comprises a halo group or $C_1$–$C_6$ alkyl group. The letter "m" represents any integer from and including zero through the number of positions on $A^1$ available for substitution; "p" represents an integer from and including zero through the number of positions on E available for substitution; "t" represents an integer equal to at least one; "s" represents an integer equal to either zero or one; and "u" represents any integer including zero.

In dihydroxy-substituted aromatic hydrocarbons in which D is represented by formula (VII) above, when more than one $Y^1$ substituent is present, they may be the same or different. The same holds true for the $R^3$ substituent. Where "s" is zero in formula (VII) and "u" is not zero, the aromatic rings are directly joined by a covalent bond with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments the parameters "t", "s", and "u" each have the value of one; both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene.

In some embodiments of dihydroxy-substituted aromatic hydrocarbons E may be an unsaturated alkylidene group. Suitable dihydroxy-substituted aromatic hydrocarbons of this type include, but are not limited to, those of the formula (IX):

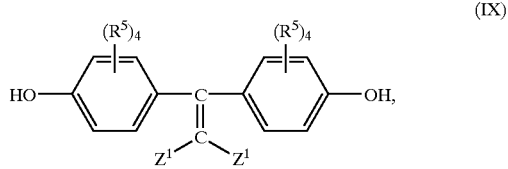

(IX)

where independently each $R^5$ is hydrogen, chlorine, bromine or a $C_{1-30}$ monovalent hydrocarbon or hydrocarbonoxy group, each $Z^1$ is hydrogen, chlorine or bromine, subject to the provision that at least one $Z^1$ is chlorine or bromine.

Suitable dihydroxy-substituted aromatic hydrocarbons also include those of the formula (X):

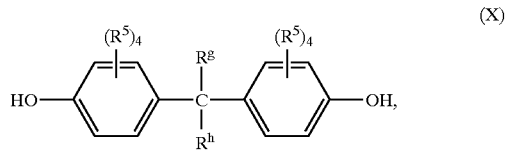

(X)

where independently each $R^5$ is as defined hereinbefore, and independently $R^g$ and $R^h$ are hydrogen or a $C_{1-30}$ hydrocarbon group.

In various embodiments of the present invention dihydroxy-substituted aromatic hydrocarbons that may be used include those disclosed by name or formula (generic or specific) in U.S. Pat. Nos. 2,991,273, 2,999,835, 3,028,365, 3,148,172, 3,271,367, 3,271,368, and 4,217,438. In some embodiments of the invention dihydroxy-substituted aromatic hydrocarbons include 4,4'-(cyclopentylidene) diphenol; 4,4'-(3,3,5-trimethylcyclopentylidene)diphenol; 4,4'-(cyclohexylidene)diphenol; 4,4'-(3,3-dimethylcyclohexylidene)diphenol; 4,4'-(3,3,5-trimethylcyclohexylidene) diphenol; 4,4'-(methylcyclohexylidene)diphenol; 4,4'-bis(3,5-dimethyl)diphenol, 1,1-bis(4-hydroxy-3-methylphenyl) cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(4-hydroxyphenyl)propane (commonly known as bisphenol A); 2,2-bis(3-phenyl-4-hydroxyphenyl)propane; 2,2-bis(4-hydroxy-3-methylphenyl)propane; 2,2-bis(4-hydroxy-3-ethylphenyl) propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene, 2,6-dihydroxy naphthalene; hydroquinone; resorcinol; $C_{1-3}$ alkyl-substituted resorcinols; 2,2-bis-4-hydroxyphenyl)butane; 2,2-bis-(4-hydroxyphenyl)-2-methylbutane; 1,1-bis-(4-hydroxyphenyl)cyclohexane; bis-(4-hydroxyphenyl); bis-(4-hydroxyphenyl)sulphide; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl4-hydroxyphenyl)-2-3,5-dimethyl-4-hydroxyphenyl) propane; bis-(3,5-dimethylphenyl-4-hydroxyphenyl) methane; 1,1-bis-(3,5-dimethylphenyl-4-hydroxyphenyl) ethane; 2,2-bis-(3,5-dimethylphenyl-4-hydroxyphenyl) propane; 2,4-bis-(3,5-dimethylphenyl-4-hydroxyphenyl)-2-methylbutane; 3,3-bis-(3,5-dimethylphenyl-4-hydroxyphenyl)pentane; 1,1-bis-(3,5-dimethylphenyl-4-hydroxyphenyl)cyclopentane; 1,1-bis-(3,54-dimethylphenyl-4-hydroxyphenyl)cyclohexane; and bis-(3,5-dimethylphenyl-4-hydroxyphenyl)sulphide. In a particular embodiment the dihydroxy-substituted aromatic hydrocarbon comprises bisphenol A.

In some embodiments of dihydroxy-substituted aromatic hydrocarbons when E is an alkylene or alkylidene group, said group may be part of one or more fused rings attached to one or more aromatic groups bearing one hydroxy substituent. Suitable dihydroxy-substituted aromatic hydrocarbons of this type include those containing indane structural units such as represented by the formula (XI), which compound is 3-(4-hydroxyphenyl)-1,1,3-trimethylindan-5-ol, and by the formula (XII), which compound is 1-(4-hydroxyphenyl)-1,3,3-trimethylindan-5-ol:

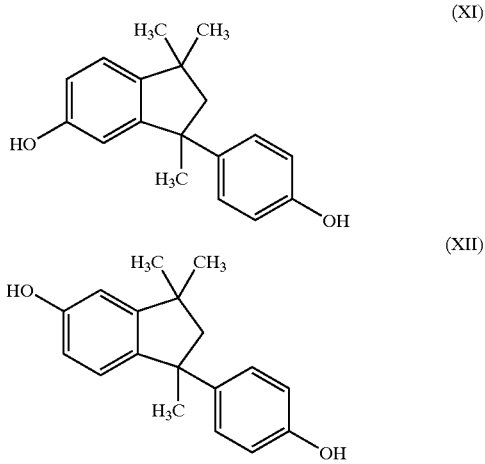

Also included among suitable dihydroxy-substituted aromatic hydrocarbons of the type comprising one or more alkylene or alkylidene groups as part of fused rings are the 2,2,2',2'-tetrahydro-1,1'-spirobi[1H-indene]diols having formula (XIII):

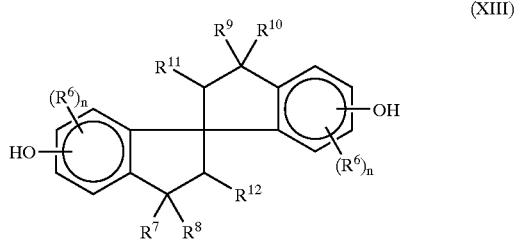

wherein each $R^6$ is independently selected from monovalent hydrocarbon radicals and halogen radicals; each $R^7$, $R^8$, $R^9$, and $R^{10}$ is independently $C_{1-6}$ alkyl; each $R^{11}$ and $R^{12}$ is independently H or $C_{1-6}$ alkyl; each n is independently selected from positive integers having a value of from 0 to 3 inclusive. In a particular embodiment the 2,2,2',2'-tetrahydro-1,1'-spirobi[1H-indene]diol is 2,2,2',2'-tetrahydro-3,3,3',3'-tetramethyl-1,1'-spirobi[1H-indene]6,6'-diol (sometimes known as "SBI"). Mixtures comprising any of the foregoing dihydroxy-substituted aromatic hydrocarbons may also be employed.

In the embodiments of the invention wherein copolyetherimides comprise structural units of both of formulas (I) and (III), but not those of formula (II), the $R^2$ radical may be derived from dihydroxy-substituted aromatic hydrocarbons which are bisphenols. In this particular embodiment dihydroxy-substituted aromatic hydrocarbons which are not bisphenols are generally not preferred. In the present context bisphenols comprise those moieties with two hydroxyl groups, each of which is in a different aromatic ring. Such bisphenols include, but are not limited to, all those disclosed hereinabove which meet this definition. In a particular embodiment of the invention bisphenols comprise the structure of formula (VI) wherein D has the structure of formula (VII) in which the letter "t" represents an integer equal to at least one; the letter "s" represents an integer equal to either zero or one; and the letter "u" represents an integer equal to at least one. In other particular embodiments bisphenols comprise at least one of those of the structure of formulas (IX), (X), (XI), (XII) or (XIII). Mixtures of bisphenols may also be employed.

The term "alkyl" as used in the various embodiments of the present invention is intended to designate both linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. The term "alkyl" also encompasses that alkyl portion of alkoxide groups. In various embodiments normal and branched alkyl radicals are those containing from 1 to about 32 carbon atoms, and include as illustrative non-limiting examples C1–C32 alkyl optionally substituted with one or more groups selected from C1–C32 alkyl, C3–C15 cycloalkyl or aryl; and C3–C15 cycloalkyl optionally substituted with one or more groups selected from C1–C32 alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those substituted or unsubstituted aryl radicals containing from 6 to 18 ring carbon atoms. Some illustrative non-limiting examples of these aryl radicals include C6–C15 aryl optionally substituted with one or more groups selected from C1–C32 alkyl, C3–C15 cycloalkyl or aryl. Some particular illustrative examples of aryl radicals comprise substituted or unsubstituted phenyl, biphenyl, toluyl and naphthyl.

In the various embodiments of the invention the ratio of total amounts of 3-linkage to 4-linkage in copolyetherimides of the invention is in one embodiment in a range of between about 100:0 and about 10:90, in another embodiment in a range of between about 100:0 and about 15:85, in another embodiment in a range of between about 99.95:0.05 and about 15:85, in another embodiment in a range of between about 99.9:0.1 and about 20:80, in another embodiment in a range of between about 99:1 and about 25:75, in still another embodiment in a range of between about 99:1 and about 30:70, in still another embodiment in a range of between about 98:2 and about 30:70, in still another embodiment in a range of between about 96:4 and about 30:70, and in still another embodiment in a range of between about 96:4 and about 35:65, wherein the designations 3-linkage and 4-linkage refer to the isomeric positions on the phthalimide ring in the totality of phthalimide-comprising structural units in the copolymer. Copolyetherimides comprising phthalimide structural units with both 3- and 4-linkages may be derived from 3,4'-disubstituted phthalimide units, or from 3,4'-disubstituted phthalimide units in combination with 3,3'-disubstituted phthalimide units, or from 3,4'-disubstituted phthalimide units in combination with 4,4'-substituted phthalimide units, or from 3,4'-disubstituted phthalimide units in combination with 3,3'-disubstituted phthalimide units and 4,4'-disubstituted phthalimide units, or from 3,3'-disubstituted phthalimide units in combination with 4,4'-disubstituted phthalimide units. All copolyetherimides comprising phthalimide structural units with both 3- and 4-linkages may further comprise terminal groups derived from one or more compounds of the formula (VIII), which compound may comprise 3-linkages or 4-linkages, or 3- and 4-linkages.

In the embodiments of the invention wherein copolyetherimides comprise structural units of both of formulas (I) and (II), and optionally structural units of the formula (III), the weight ratios of the units of formula (I) to those of formula (II) (i.e., of 3,3'-disubstituted to 3,4'-disubstituted phthalimide units) are in various embodiments in the range of between about 99.9:0.1 and about 25:75, and in particular embodiments in the range of between about 99:1 and about 25:75. These may also be the molar ratios of said units, since in some embodiments they have equal formula weights. In the embodiments of the invention wherein copolyetherimides comprise structural units of both of formulas (I) and (III), but not those of formula (II), the weight ratios of the units of formula (I) to those of formula (III) (i.e., of 3,3'-disubstituted to 4,4'-disubstituted phthalimide units) are in various embodiments in the range of between about 99.9:0.1 and about 10:90, in particular embodiments in the range of between about 99:1 and about 20:80, and in more particular embodiments in the range of between about 90:10 and about 25:75, and in still more particular embodiments in the range of between about 90:10 and about 30:70. These may also be the molar ratios of said units, since in some embodiments they have equal formula weights.

Methods for the preparation of polyetherimides are described in many publications and patents, and any of the appropriate methods may be employed to prepare the copolyetherimides of the invention. Illustrative methods of making the polyetherimides are those disclosed in, for example, U.S. Pat. Nos. 3,847,867, 3,814,869, 3,850,885, 3,852,242, 3,855,178, 3,983,093, and 5,830,974.

One suitable method to prepare the copolyetherimides is by the reaction of at least one diamino compound with a mixture comprising at least one dianhydride, optionally in the presence one or more chain termination agents. In some particular embodiments a suitable method to prepare the copolyetherimides is by the reaction of at least one diamino compound with a mixture comprising at least two dianhydrides, optionally in the presence one or more chain termination agents. In some embodiments suitable chain termination agents are mono-anhydrides, including, but not limited to, phthalic anhydride. Suitable dianhydrides may in turn be prepared by known methods, for example by the reaction of a di-alkali metal salt of a dihydroxy-substituted aromatic hydrocarbon with at least one of a 3- or 4-substituted N-alkylphthalimide, most often the fluoro-, chloro-, bromo- or nitro-substituted phthalimide, followed by conversion by known methods to the corresponding dianhydride. Suitable di-alkali metal salts of a dihydroxy-substituted aromatic hydrocarbon are derived from those dihydroxy-substituted aromatic hydrocarbons described hereinabove. Suitable dianhydrides include, but are not limited to, 2,2-bis[4-(3,4-dicarboxyphenoxy)phenyl] propane dianhydride; 2,2-bis[4-(2,3-dicarboxyphenoxy) phenyl]propane dianhydride; and the mixed dianhydride 2-[4-(3,4-dicarboxyphenoxy)phenyl]-2-[4-(2,3-dicarboxyphenoxy)phenyl]propane dianhydride. The reaction of di-alkali metal salt with substituted N-alkylphthalimide often takes place in the presence of a phase transfer catalyst.

In another embodiment a suitable method to prepare copolyetherimides is by the reaction, in the presence of a phase transfer catalyst, of a mixture comprising 3,3'- and 3,4'-disubstituted bis(phthalimides) with a di-alkali metal salt of a dihydroxy-substituted aromatic hydrocarbon of the formula HO—R$^2$—OH, wherein R$^2$ is as previously defined. In another embodiment a suitable method to prepare the copolyetherimides is by the reaction, in the presence of a phase transfer catalyst, of a mixture comprising 3,3'-, 3,4'- and 4,4'-substituted bis(phthalimides) with a di-alkali metal salt of a dihydroxy-substituted aromatic hydrocarbon of the formula HO—R$^2$—OH, wherein R$^2$ is as previously defined. In another embodiment a suitable method to prepare copolyetherimides is by the reaction, in the presence of a phase transfer catalyst, of a mixture comprising 3,3'- and 4,4'-disubstituted bis(phthalimides) with a di-alkali metal salt of a dihydroxy-substituted aromatic hydrocarbon of the formula HO—R$^2$—OH, wherein R$^2$ is derived from a bisphenol as previously defined. In each of these methods the designation of substituent position refers to substituent(s) in the phthalimide rings. In particular embodiments the di-alkali metal salt is the disodium salt of bisphenol A. In various embodiments 3,3'-; 3,4'-; and 4,4'-disubstituted bis (phthalimides) are illustrated by formulas (XIV). (XV), and (XVI), respectively:

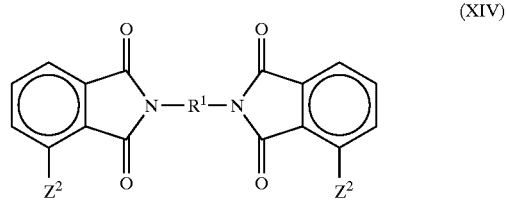

(XIV)

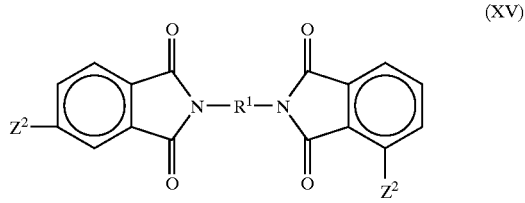

(XV)

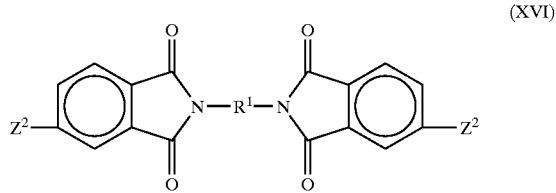

(XVI)

wherein R$^1$ is as defined hereinabove and substituents Z$^2$ are fluoro, chloro, bromo or nitro substituents. In some particular embodiments R$^1$ has the structure of formula (IV) wherein Q is oxygen and wherein the unassigned positional isomer about the aromatic ring is either meta or para to oxygen and substituents Z$^2$ are fluoro, chloro, bromo or nitro substituents. In one particular embodiment R$^1$ has the structure of formula (IV) wherein Q is oxygen and the unassigned positional isomer about the aromatic ring is para to oxygen and substituents Z$^2$ are chloro. In some particular embodiments a suitable method to prepare the copolyetherimides is by the reaction, in the presence of a phase transfer catalyst, of the disodium salt of bisphenol A with a mixture comprising 3,3'-; 3,4'- and, optionally 4,4'-dichloro-substituted [N-phthalimidophenyl]ethers, wherein the said ethers are derived from 4,4'-diaminodiphenyl ether.

In various embodiments phase transfer catalysts are those that are stable at relatively high temperatures. They include quaternary phosphonium salts of the type disclosed in U.S. Pat. No. 4,273,712; N-alkyl-4-dialkylaminopyridinium salts of the type disclosed in U.S. Pat. Nos. 4,460,778 and 4,595,760; and guanidinium salts of the type disclosed in U.S. Pat. Nos. 5,132,423 and 5,116,975. In some particular embodiments suitable phase transfer catalysts, by reason of their exceptional stability at high temperatures and their effectiveness to produce high molecular weight aromatic polyether polymers in high yield are alpha-omega-bis (pentaalkylguanidinium)alkane salts and hexaalkylguanidinium salts including, but not limited to, hexaalkylguanidinium halides and especially hexaalkylguanidinium chlorides are often employed in particular embodiments. Methods for employing guanidinium salts are disclosed, for example, in U.S. Pat. No. 5,229,482.

In various embodiments the di-alkali metal salt of said dihydroxy-substituted aromatic hydrocarbon, such as the disodium salt of bisphenol A, may be contacted with the desired mixture comprising disubstituted bis(phthalimides) under reflux in at least one relatively high boiling solvent in the presence of the phase transfer catalyst. In various embodiments said solvent has a boiling point above about 150° C. in order to facilitate the reaction which typically requires temperatures in the range of between about 125° C. and about 250° C. Suitable solvents of this type include, but are not limited to, ortho-dichlorobenzene, para-dichlorobenzene, dichlorotoluene, 1,2,4-trichlorobenzene, diphenyl sulfone, phenetole, anisole and veratrole, and mixtures thereof. In some embodiments of the invention it may be preferred not to prepare copolyetherimides in a dipolar aprotic solvent, for reasons such as cost and ease of solvent recycle.

Reaction mixtures for preparation of copolyetherimides of the invention may also comprise at least one chain termination agent, hereinafter sometimes "CTA". Suitable chain termination agents include, but are not limited to, all those with an activated substituent suitable for displacement by a phenoxide group during the polymerization process. In various embodiments suitable chain termination agents include, but are not limited to, alkyl halides such as alkyl chlorides, and aryl halides including, but not limited to, chlorides of formulas (XVII) and (XVIII):

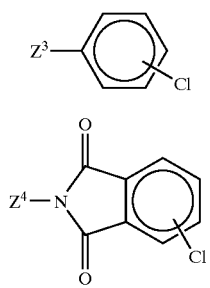

wherein the chlorine substituent is in the 3- or 4-position, and $Z^3$ and $Z^4$ comprise a substituted or unsubstituted alkyl or aryl group. In some embodiments suitable chain termination agents of formula (XVII) comprise monochlorobenzophenone or monochlorodiphenylsulfone. In some embodiments suitable chain termination agents of formula (XVIII) comprise at least one mono-substituted mono-phthalimide including, but not limited to, a monochlorophthalimide such as 4-chloro-N-methylphthalimide, 4-chloro-N-butylphthalimide, 4-chloro-N-octadecylphthalimide, 3-chloro-N-methylphthalimide, 3-chloro-N-butylphthalimide, 3-chloro-N-octadecylphthalimide, 4-chloro-N-phenylphthalimide or 3-chloro-N-phenylphthalimide. In other embodiments suitable chain termination agents of formula (XVIII) comprise at least one mono-substituted bis-phthalimide including, but not limited to, a monochlorobisphthalimidobenzene including, but not limited to, 1-[N-(4-chlorophthalimido)]-3-(N-phthalimido)benzene (as in formula (XIX)) or 1-[N-(3-chlorophthalimido)]-3-(N-phthalimido)benzene (as in formula (XX)), the latter CTA's often in admixture with the analogous bis(chloro-N-phthalimido)benzene monomer.

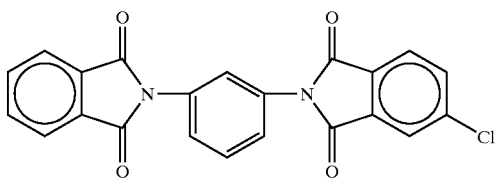

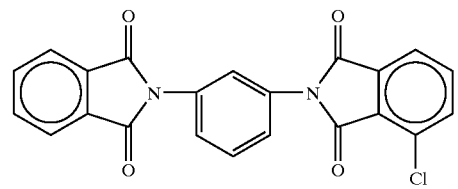

In still other embodiments suitable chain termination agents of formula (XVIII) comprise other mono-substituted, bisphthalimido compounds including, but not limited to, monochlorobisphthalimidodiphenyl sulfone, monochlorobisphthalimidodiphenyl ketone, and monochlorobisphthalimidophenyl ethers including, but not limited to, 4-[N-(4-chlorophthalimido)]phenyl-4'-(N-phthalimido)phenyl ether (as in formula (XXI)), or 4-[N-(3-chlorophthalimido) phenyl]4'-(N-phthalimido)phenyl ether (as in formula (XXI)), or the corresponding isomers derived from 3,4'-diaminodiphenyl ether.

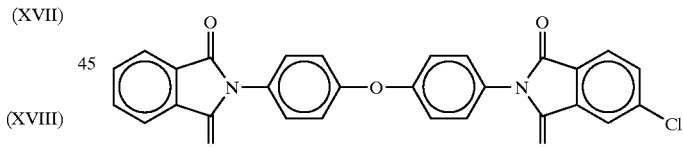

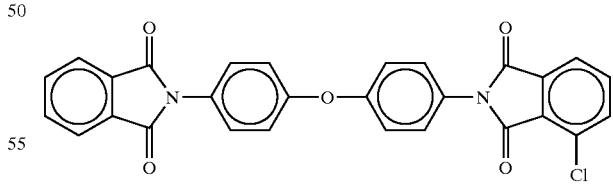

Chain termination agents may optionally be in admixture with bis-substituted bis(phthalimide) monomers. In one embodiment mono-substituted bis-phthalimide chain termination agents may optionally be in admixture with bis-substituted bis-phthalimide monomers in one particular embodiment monochlorobisphthalimidophenyl ether chain termination agents may often be in admixture with at least one bis-substituted (N-phthalimido)phenyl ether including, but not limited to, at least one bis(chloro-N-phthalimido) phenyl ether.

In yet another embodiment a suitable method to prepare copolyetherimides of the invention is by the reaction, in the presence of a phase transfer catalyst, of a mixture comprising at least one 3,3'-disubstituted bis(phthalimide) and at least one 3- or 4-monosubstituted mono-phthalimide with a di-alkali metal salt of a dihydroxy-substituted aromatic hydrocarbon of the formula HO—$R^2$—OH, wherein $R^2$ is as previously defined. In a particular embodiment a suitable 3,3'-disubstituted bis(phthalimide) comprises 3,3'-dichloro [N-phthalimidophenyl] ether and a suitable 3- or 4-monosubstituted mono-phthalimide comprises 3- or 4-monochloro [N-phthalimidophenyl] ether, while a suitable di-alkali metal salt of a dihydroxy-substituted aromatic hydrocarbon comprises the disodium salt of bisphenol A.

In various embodiments 3,3'-disubstituted [N-phthalimidophenyl] ethers and mixed positional isomers thereof are illustrated by formula (XXIII) wherein the unassigned positional isomer about the phenyl ring is meta or para to oxygen. In particular embodiments the unassigned positional isomer about the phenyl ring in formula (XXII) is para to oxygen.

(XXIII)

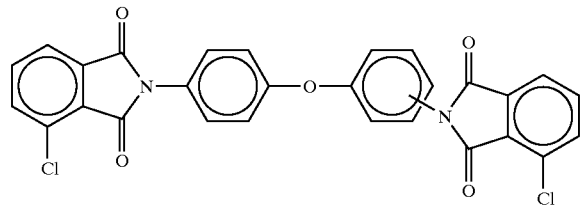

In other particular embodiments 3- and 4-monosubstituted [N-phthalimidophenyl] ethers are 4-[N-(4-chlorophthalimido)phenyl]4'-[N-(phthalimido)phenyl] ether (as in formula (XXI)) or 4[N-(3-chlorophthalimido)phenyl]4'-(N-phthalimido)phenyl ether (as in formula (XXII)).

Chain-termination of copolyetherimides with monosubstituted chain-termination agents such as a monochlorophthalimide or a monochloro bis(phthalimide) results in copolyetherimide chains comprising unsubstituted phthalimide end-groups. The amount of chain termination agent is typically adjusted to afford a copolyetherimide having a weight average molecular weight, as determined by gel permeation chromatography relative to polystyrene standards, in the range of between about 30,000 and about 80,000 in one embodiment and in the range of between about 40,000 and about 70,000 in another embodiment. This is generally an amount of chain termination agent in the range in one embodiment of between about 1 and about 10 mole percent and in another embodiment of between about 2 and about 10 mole percent, based on disubstituted bis (phthalimide) monomer. Copolyetherimides in various embodiments of the invention have end-groups which may comprise structural units derived from any chain termination agent or mixture of chain termination agents present in the reaction mixture. The copolyetherimides may be terminated in one embodiment with unsubstituted phthalimide end-groups in an amount in one embodiment in a range of between about 2 mole % and about 8 mole %, in another embodiment in a range of between about 2.5 mole % and about 8 mole %, in another embodiment in a range of between about 3.5 mole % and about 8 mole %, in another embodiment in a range of between about 4.5 mole % and about 7.5 mole % and in still another embodiment in a range of between about 5 mole % and about 7 mole %. In some embodiments copolyetherimides of the invention are essentially free of substituted phthalimide end-groups resulting, for example, from reaction of only one substituent on 3,3'- and 3,4'-disubstituted bis(phthalimides), such as the corresponding chloro-substituted monomers. In other embodiments copolyetherimides of the invention have less than about 1.5 mole % of substituted phthalimide end-groups, in still other embodiments less than about 1.2 mole % of substituted phthalimide end-groups, and in still other embodiments less than about 1 mole % of substituted phthalimide end-groups. In one particular embodiment copolyetherimides of the invention have less than about 1.5 mole % of chloro-phthalimide end-groups and in another particular embodiment less than about 1.2 mole % of chloro-phthalimide end-groups. In another particular embodiment copolyetherimides of the invention have about 1 mole % of chloro-phthalimide end-groups. In other particular embodiments copolyetherimides of the invention may comprise phenolic end-groups. Copolyetherimides of the invention may have phenolic end-groups in one embodiment in the range of between about 0.1 mole % and about 2.3 mole %, in another embodiment in the range of between about 0.3 mole % and about 2.3 mole %, in another embodiment in the range of between about 0.4 mole % and about 2 mole %, and in still another embodiment in the range of between about 0.5 mole % and about 1.5 mole %.

Copolyetherimides of the invention have an intrinsic viscosity in one embodiment of greater than about 0.2 deciliters per gram; in another embodiment of at least 0.3 deciliters per gram, in another embodiment of at least 0.35 deciliters per gram, all measured in m-cresol at 25° C. In some embodiments copolyetherimides of the invention have an intrinsic viscosity of up to about 0.7 deciliters per gram, as measured in m-cresol at 25° C.

The copolyetherimides of this invention are further characterized by a glass transition temperature, Tg, of at least about 218° C. in one embodiment, of at least about 220° C. in another embodiment and of at least about 225° C. in still another embodiment. Typically, a Tg of 225° C. is higher by at least about 7° C. than the Tg's of commercially available polyetherimides. Heat distortion temperatures (HDT) of the copolyetherimides of the invention are also higher than those of previously known polymers of this type. In one embodiment the HDT of the copolyetherimides is at least about 205° C.; in another embodiment at least about 210° C.; and in still another embodiment at least about 215° C., all measured at 0.455 megapascals (mPa).

Other advantageous properties are also possessed by the copolyetherimides of the invention. They include melt flow properties and ductility comparable to or better than those of commercial polyetherimides, and low polydispersity (Mw/Mn) as compared with homopolyetherimides. In one particular embodiment copolyetherimides of the invention comprising structural units derived from 4,4'-diaminodiphenyl ether have melt flow properties and ductility comparable to or better than those of commercial polyetherimides, and low polydispersity (Mw/Mn) as compared with homopolyetherimides having a structure corresponding to preparation from 4,4'-diaminodiphenyl ether and 2,2-bis[4-(2,3-dicarboxyphenoxy)phenyl]-propane dianhydride. Copolyetherimides of the invention have a polydispersity in one embodiment in the range of between about 2.3 and about 3, in another embodiment in the range of between about 2.4 and about 2.8, and in still another embodiment in the range of between about 2.4 and about 2.6. Ductility may be measured as the temperature of transition between the brittle and ductile states (from brittle to ductile as the temperature is increased), as shown by the falling dart (Dynatup) impact test (ASTM method D3763), said temperature typically being at most 30° C.

Compositions comprising copolymers of the invention may be prepared optionally containing effective amounts of one or more additives known in the art, illustrative examples of which include, but are not limited to, antioxidants, flame retardants, drip retardants, UV blockers, nucleating agents, dyes, pigments, colorants, blowing agents, reinforcing agents, fillers, stabilizers, antistatic agents, processing aids, plasticizers, mold release agents, lubricants and the like. These additives are known in the art, as are their effective levels and methods of incorporation. Effective amounts of the additives vary widely, but they are sometimes present in an amount up to about 50% or more by weight, based on the weight of the entire composition. Appropriate amounts of additives may be readily determined without undue experimentation.

Illustrative examples of suitable fillers comprise particulate fillers (for example, fillers having an aspect ratio less than about 3), reinforcing fillers, conductive fillers (e.g., conductive carbon black, and vapor grown carbon fibers having an average diameter of about 3 to about 500 nanometers). Suitable reinforcing fillers are those which increase the rigidity of the composition. Amongst these, fibrous materials are preferred, in particular glass fibers such as those made from E, A, C, ECR, R, S, D, NE glasses and quartz. In some embodiments the fibers comprise low alkali E-glass. Suitable fibers include those with a fiber diameter of from about 8 to about 14 micrometers, the length of the glass fibers in the finished injection molding being from about 0.01 millimeters (mm) to about 0.5 mm. The glass fibers may be employed as rovings or as chopped or milled glass fibers, and may be provided with a suitable finish and an adhesion promoter or promoter system based on silanes. Other fibrous reinforcing materials, e.g. carbon fibers and microfibers, potassium titanate single-crystal fibers, gypsum fibers, aluminum oxide fibers, aluminum silicate fibers, magnesium oxide fibers or asbestos may also be incorporated. The amount of optional reinforcing filler is generally an amount sufficient to increase the rigidity of the composition. The amount of reinforcing fillers is advantageously from about 5% to about 60% by weight, especially from about 10% to about 40% by weight; all based on the total weight of the composition.

Non-fibrous fillers, e.g. glass beads, hollow glass beads, chalks, micas, taics, quartzes and natural or calcined kaolins are further illustrative fillers, as are combinations of these materials with glass fibers. Like the glass fibers, these latter fillers may be provided with a finish and/or an adhesion promoter or adhesion promoter system. Mixtures of fillers may also be employed in compositions of the invention.

The copolyetherimides of the invention can be used to prepare articles requiring a higher use temperature than the previously available polyetherimides. Such articles may be used in applications such as, but not limited to, food storage, airplane parts, medical devices and microelectronics.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner. All parts, percentages and ratios are by weight. Glass transition temperatures (Tg) were measured using Differential Scanning Calorimetry (DSC) carried out on a Perkin Elmer DSC-7 instrument, using the data from the 2nd heat with a program going from 50° C. to 300° C. at 20° C. per minute heating rate under nitrogen.

EXAMPLE 1

A mixture of 3,3'-, 3,4'- and 4,4'-dichloro[N-phthalimidophenyl] ethers was prepared by reaction of 4,4'-diaminodiphenyl ether with a mixture of 3-and 4-chlorophthalic anhydrides. The resulting mixture of ethers had a ratio of 3-linkage to 4 linkage of about 3:1. A solution in o-dichlorobenzene of 13,442 parts of the mixture of ethers and 947.2 parts of a corresponding monochlorophthalimide mixture was distilled with removal of water until less than 15 ppm of water was present. A slurry of 7,102 parts of bisphenol A disodium salt in o-dichlorobenzene was added, this amount being calculated to be some 3% short of the stoichiometric amount. Distillation was continued until less than 10 ppm of water was present and 41,680 parts of o-dichlorobenzene remained, corresponding to a 30% level of copolyetherimide in solvent.

A 20% solution of hexaethylguanidinium chloride in o-dichlorobenzene (314 parts) was added portionwise, with 50% being added initially and two 25% portions after 15 and 30 minutes. An exothermic reaction caused the mixture to heat again to reflux temperature. Refluxing was continued with addition of further small portions of bisphenol A disodium salt slurry until the weight average molecular weight (Mw) was 46,700. The reaction was then quenched with phosphoric acid and the mixture was cooled, diluted with o-dichlorobenzene to 10% solids and washed with water. After isolation by antisolvent precipitation, the resulting copolyetherimide had a Mw of 45,500 and a number average molecular weight (Mn) of 18,500.

EXAMPLE 2

The procedure of Example 1 was repeated, using 14,422 parts of the mixture of ethers, 473.5 parts of monochlorophthalimides from the same monomers and 7,321 parts of bisphenol A disodium salt. The resulting copolyetherimide had a Mw of 62,400 and a Mn of 24,200.

EXAMPLE 3

The procedure of Example 1 was repeated, using 13,767 parts of a mixture of 3,3'- and 3,4'-disubstituted [N-phthalimidophenyl] ethers with a ratio of 3-linkage to 4-linkage of about 98:2, 643 parts of monochlorophthalimides from the same monomers and 7,070 parts of bisphenol A disodium salt. The resulting copolyetherimide had a Mw of 54,100 and a Mn of 20,800.

The properties of the products of Examples 1, 2 and 3 are listed in the following table. Also included in the table are the properties of Controls 1 and 2 which were commercially available polyetherimides having a structure corresponding to preparation from bisphenol A disodium salt and a mixture of 4 parts m-bis(3-chloro-N-phthalimido)benzene and 96 parts m-bis(4-chloro-N-phthalimido)benzene. Viscosity values ($\eta$) were determined at 380° C., and 1000 s$^{-1}$.

TABLE 1

| Example | 1 | 2 | 3 | Control 1 | Control 2 |
|---|---|---|---|---|---|
| Ratio, 3- to 4-isomer | 3:1 | 3:1 | — | 4:96 | 4:96 |
| Mw | 62,400 | 45,500 | 54,100 | 43,900 | 51,700 |
| Mn | 24,200 | 18,500 | 20,800 | 18,700 | 22,500 |
| Mw/Mn | 2.58 | 2.46 | 2.60 | 2.35 | 2.30 |
| η, poise | 4,300 | 2,100 | 2,800 | 2,500 | 4,100 |
| Notched Izod impact strength, J/m | 60.3 | 47.5 | 47.5 | 40.1 | 43.8 |
| Brittle-ductile transition, °C. | <23 | — | <23 | 65 | 30 |
| Tg, °C. | 232 | 229 | 235 | 216 | 218 |
| HDT, 0.455 mPa, °C. | 219 | 216 | 222 | 202 | — |

Several things will be apparent upon examining the data in the table. First, the glass transition temperatures of the copolyetherimides of the invention are all above 225° C. and are substantially higher than those of commercial polyetherimides (Controls 1 and 2). Second, the molecular weights (both Mw and Mn) of the copolyetherimides of the invention are comparable to, and the heat distortion temperatures and ductilities (as indicated by Izod impact strength and brittle-ductile transition) are greater than, those of said commercial polyetherimides.

With respect to melt flow, attention is directed to the viscosity (η) values which are generally a good measure thereof. The product of Example 1, having a molecular weight substantially greater than that of Control 2, has a similar melt flow. The same is true of the product of Example 2 and Control 1. The combination of improved flow along with increased Tg and ductility in copolyetherimides of the invention is unexpected. In various embodiments copolyetherimides of the invention tend to have a viscosity value less than or approximately equal to the viscosity of a polyetherimide of comparable molecular weight derived from bisphenol A disodium salt and a 4:96 ratio of m-bis[3- and 4-chloro-N-(phthalimido)benzenes, said viscosity determined at 380° C. and 1000 s$^{-1}$. In the present context comparable molecular weight means molecular weights which differ by no more than about 15% and usually by no more than about 10%.

EXAMPLE 4

A polyetherimide is prepared from a mixture of 3,3'-dichloro-[N-phthalimidophenyl] ether and either 4-[N-(4-chlorophthalimido)phenyl]4'-[N-phthalimidophenyl] ether or 4[N-(3-chlorophthalimido)phenyl]-4'-[N-phthalimidophenyl] ether or a mixture thereof using the method essentially as described in Example 1. The properties of the polyetherimide are similar to those obtained for the copolyetherimide of Example 3.

EXAMPLE 5

Polyetherimides were prepared comprising structural units derived from the following dihydroxy-substituted aromatic hydrocarbons and diamines: hydroquinone (HQ), 4,4'-biphenol (BP), bisphenol A (BPA); meta-phenylenediamine (MPD), 2,4-toluenediamine (TDA), diaminodiphenylsulfone (DDS), and ODA. Table 2 shows ratio of 3-linkage to 4-linkage, glass transition temperatures, and viscosity values (η) determined at 380° C., and 1000 s-1 for the polyetherimides wherein the designations 3-linkage and 4-linkage refer to the isomeric positions on the phthalimide ring in the totality of phthalimide-comprising structural units in the polymer.

TABLE 2

| Structural units | 3:4 linkage ratio | Mw | Tg, °C. | η, poise |
|---|---|---|---|---|
| BPA/MPD | 30/70 | 46,000 | 220 | 2,500 |
| BPA/MPD | 33/67 | 56,000 | 222 | 3,100 |
| BPA/MPD | 70/30 | 45,000 | 226 | — |
| BPA/MPD | 100/0 | 57,000 | 236 | 2,500 |
| BPA/TDA | 0/100 | 45,000 | 245 | — |
| BPA/TDA | 100/0 | 61,000 | 255 | 3,160 |
| BPA/DDS | 4/96 | 48,000 | 247 | — |
| BPA/DDS | 75/25 | 30,000 | 249 | — |
| BPA/DDS | 100/0 | 55,000 | 261 | 6,600 |
| HQ/ODA | 0/100 | — | 242 | — |
| HQ/ODA | 100/0 | — | 269 | — |
| BP/ODA | 0/100 | — | 229 | — |
| BP/ODA | 60/40 | — | 245 | — |

The examples show that the glass transition temperatures of polyetherimides increase as the content of 3-linkage increases regardless of the structural units comprising the polyetherimide.

EXAMPLE 6

AND COMPARATIVE EXAMPLE 1

A composition comprising the copolyetherimide of Example 3 and 30 wt. % glass fibers was prepared by extrusion and molded into test parts. Glass fibers were grade OC165A-11 C from Owens-Corning. A comparative example comprising the copolyetherimide of Example 3 without glass fiber was also prepared and molded. Molded test parts were subjected to ASTM testing protocols. Table 3 shows properties of each composition.

TABLE 3

| | Ex.6 | C.Ex.1 |
|---|---|---|
| Flex modulus, mPa | 7870 | 3550 |
| Tensile strength yield, mPa | 141 | 114 |
| Tensile modulus, mPa | 9772 | 3385 |
| Melt flow rate @ 337° C. g/10 min. | 5.6 | 10.5 |
| Notched Izod impact strength, J/m | 64 | 26.6 |
| Tg, °C. | 236 | 239 |
| HDT, 0.455 mPa, °C. | 230 | 224 |
| HDT, 1.82 mPa, °C. | 227 | 208 |

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention. It is also anticipated that advances in science and technology will make equivalents and substitutions possible that are not now contemplated by reason of the imprecision of language and these variations should also be construed where possible to be covered by the appended claims. All patents cited herein are incorporated herein by reference.

What is claimed is:

1. A copolyetherimide having a glass transition temperature of at least about 218° C., said copolyetherimide comprising structural units of the formulas (I) and (II):

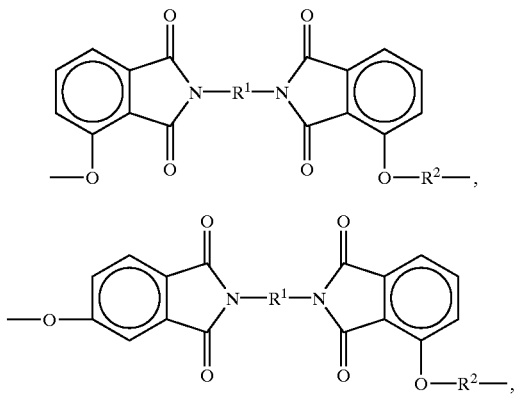

and optionally structural units of the formula (III):

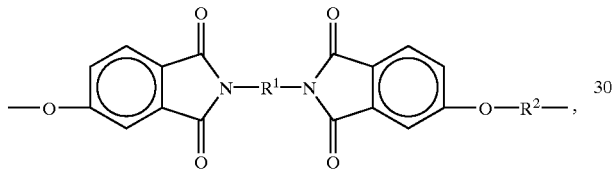

wherein $R^1$ comprises an unsubstituted $C_{6-22}$ divalent aromatic hydrocarbon or a substituted $C_{6-22}$ divalent aromatic hydrocarbon comprising halogen or alkyl substituents or mixtures of said substituents; or a divalent radical of the general formula (IV):

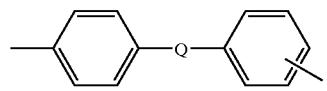

group wherein the unassigned positional isomer about the aromatic ring is either meta or para to Q, and Q is a covalent bond or a member selected from the consisting of formulas (V):

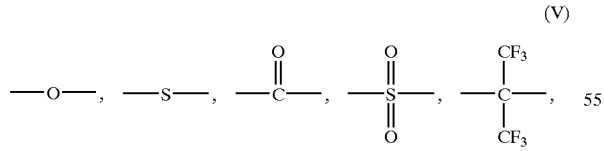

and an alkylene or alkylidene group of the formula $C_yH_{2y}$, wherein y is an integer from 1 to 5 inclusive, and $R^2$ is a divalent aromatic radical; the weight ratio of units of formula (I) to those of formula (II) being in the range of about 99.9:0.1 and about 25:75.

2. The copolyetherimide according to claim 1 having a Tg greater than about 218° C.

3. The copolyetherimide according to claim 1 comprising structural units of the formula (III).

4. The copolyetherimide according to claim 1 wherein $R^1$ is derived from at least one diamine selected from the group consisting of meta-phenylenediamine; para-phenylenediamine; 2-methyl-4,6-diethyl-1,3-phenylenediamine; 5-methyl-4,6-diethyl-1,3-phenylenediamine; bis(4-aminophenyl)-2,2-propane; bis(2-chloro-4-amino-3,5-diethylphenyl)methane, 4,4'-diaminodiphenyl, 3,4'-diaminodiphenyl, 4,4'-diaminodiphenyl ether, 3,4'-diaminodiphenyl ether, 4,4'-diaminodiphenyl sulfone, 3,4'-diaminodiphenyl sulfone, 4,4'-diaminodiphenyl ketone, 3,4'-diaminodiphenyl ketone, 2,4-toluenediamine; and mixtures thereof.

5. The copolyetherimide according to claim 1 wherein $R^2$ is derived from at least one dihydroxy-substituted aromatic hydrocarbon of the formula (VI):

$$HO-D-OH \quad (VI)$$

wherein D has the structure of formula (VII):

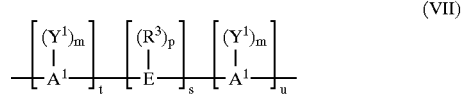

wherein $A^1$ represents an aromatic group;

E comprises a sulfur-containing linkage, sulfide, sulfoxide, sulfone; a phosphorus-containing linkage, phosphinyl, phosphonyl; an ether linkage; a carbonyl group; a tertiary nitrogen group; a silicon-containing linkage; silane; siloxy; a cycloaliphatic group; cyclopentylidene, 3,3,5-trimethylcyclopentylidene, cyclohexylidene, 3,3-dimethylcyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene; an alkylene or alkylidene group, which group may optionally be part of one or more fused rings attached to one or more aromatic groups bearing one hydroxy substituent; an unsaturated alkylidene group, or two or more alkylene or alkylidene groups connected by a moiety different from alkylene or alkylidene and selected from the group consisting of an aromatic linkage, a tertiary nitrogen linkage; an ether linkage; a carbonyl linkage; a silicon-containing linkage, silane, siloxy; a sulfur-containing linkage, sulfide, sulfoxide, sulfone; a phosphorus-containing linkage, phosphinyl, and phosphonyl;

$R^3$ comprises hydrogen; a monovalent hydrocarbon group, alkenyl, allyl, alkyl, aryl, aralkyl, alkaryl, or cycloalkyl;

$Y^1$ independently at each occurrence is selected from the group consisting of an inorganic atom, a halogen; an inorganic group, a nitro group; an organic group, a monovalent hydrocarbon group, alkenyl, allyl, alkyl, aryl, aralkyl, alkaryl, cycloalkyl, and an alkoxy group;

the letter "m" represents any integer from and including zero through the number of positions on $A^1$ available for substitution;

the letter "p" represents an integer from and including zero through the number of positions on E available for substitution;

the letter "t" represents an integer equal to at least one;

the letter "s" represents an integer equal to either zero or one; and

"u" represents any integer including zero.

6. The copolyetherimide of claim 5 wherein $R^2$ structural units in each of formulas (I), (II) and (III) are the same.

7. The copolyetherimide of claim 5 wherein at least a portion of $R^2$ structural units in at least two of formulas (I), (II) and (III) are not the same.

8. The copolyetherimide according to claim 1 wherein $R^2$ is derived from at least one dihydroxy-substituted aromatic hydrocarbon selected from the group consisting of 4,4'-(cyclopentylidene)diphenol; 4,4'-(3,3,5-trimethylcyclopentylidene)diphenol; 4,4'-cyclohexylidene)diphenol; 4,4'-(3,3-dimethylcyclohexylidene)diphenol; 4,4'-(3,3,5-trimethylcyclohexylidene)diphenol; 4,4'-(methylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(4-hydroxyphenyl)propane; 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene, 2,6-dihydroxy naphthalene; hydroquinone; resorcinol; $C_{1-3}$ alkyl-substituted resorcinols; 2,2-bis-(4-hydroxyphenyl)butane; 2,2-bis-(4-hydroxyphenyl)-2-methylbutane; 1,1-bis-(4-hydroxyphenyl)cyclohexane; bis-(4-hydroxyphenyl); bis-(4-hydroxyphenyl)sulphide; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl)propane; bis-(3,5-dimethylphenyl-4-hydroxyphenyl)methane; 1,1-bis-(3,5-dimethylphenyl-4-hydroxyphenyl)ethane; 2,2-bis-(3,5-dimethylphenyl-4-hydroxyphenyl)propane; 2,4-bis-(3,5-dimethylphenyl-4-hydroxyphenyl)-2-methylbutane; 3,3-bis-(3,5-dimethylphenyl-4-hydroxyphenyl)pentane; 1,1-bis-(3,5-dimethylphenyl-4-hydroxyphenyl)cyclopentane; 1,1-bis-(3,5-dimethylphenyl-4-hydroxyphenyl)cyclohexane; bis-(3,5-dimethylphenyl-4-hydroxyphenyl)sulphide, 3-(4-hydroxyphenyl)-1,1,3-trimethylindan-5-ol, 1-(4-hydroxyphenyl)-1,3,3-trimethylindan-5-ol, 2,2,2',2'-tetrahydro-3,3,3',3'-tetramethyl-1,1'-spirobi[1H-indene]-6,6'-diol, and mixtures thereof.

9. The copolyetherimide according to claim 1 wherein $R^2$ is derived from at least one dihydroxy-substituted aromatic hydrocarbon selected from the group consisting of those of the formula (IX):

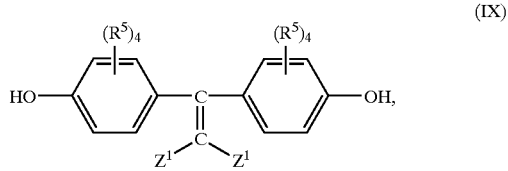

(IX)

where independently each $R^5$ is hydrogen, chlorine, bromine or a $C_{1-30}$ monovalent hydrocarbon or hydrocarbonoxy group, each $Z^1$ is hydrogen, chlorine or bromine, subject to the provision that at least one $Z^1$ is chlorine or bromine; and those of the formula (X):

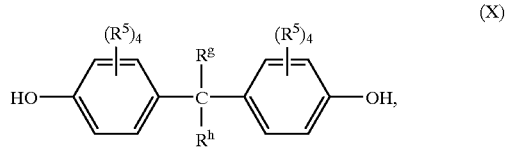

(X)

where independently each $R^5$ is as defined hereinbefore, and independently $R^g$ and $R^h$ are hydrogen or a $C_{1-30}$ hydrocarbon group.

10. The copolyetherimide according to claim 9 wherein $R^2$ is derived from bisphenol A.

11. The copolyetherimide according to claim 1 further comprising structural units derived from at least one chain termination agent.

12. The copolyetherimide according to claim 11 wherein the chain termination agent is at least one unsubstituted or substituted member selected from the group consisting of alkyl halides, alkyl chlorides, aryl halides, aryl chlorides, and chlorides of formulas (XVII) and (XVIII):

(XVII)

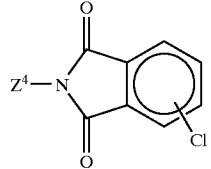

(XVIII)

wherein the chlorine substituent is in the 3- or 4-position, and $Z^3$ and $Z^4$ comprise a substituted or unsubstituted alkyl or aryl group.

13. The copolyetherimide according to claim 11 wherein the chain termination agent is at least one member selected from the group consisting of monochlorobenzophenone, monochlorodiphenylsulfone; a monochlorophthalimide; 4-chloro-N-methylphthalimide, 4-chloro-N-butylphthalimide, 4-chloro-N-octadecylphthalimide, 3-chloro-N-methylphthalimide, 3-chloro-N-butylphthalimide, 3-chloro-N-octadecylphthalimide, 4-chloro-N-phenylphthalimide, 3-chloro-N-phenylphthalimide; a mono-substituted bisphthalimide; a monochlorobisphthalimidobenzene; 1-[N-(4-chlorophthalimido)]-3-(N-phthalimido)benzene; 1-[N-(3-chlorophthalimido)]-3-(N-phthalimido)benzene; monochlorobisphthalimidodiphenyl sulfone, monochlorobisphthalimidodiphenyl ketone, a monochlorobisphthalimidophenyl ether; 4-[N-(4-chlorophthalimido)]phenyl-4'-(N-phthalimido)phenyl ether, 4-[N-(3-chlorophthalimido)phenyl]4'-(N-phthalimido)phenyl ether, and the corresponding isomers of the latter two compounds derived from 3,4'-diaminodiphenyl ether.

14. The copolyetherimide according to claim 1 wherein the weight ratio of units of formula I to those of formula II is in the range of between about 99:1 and about 25:75.

15. The copolyetherimide according to claim 1 which has a heat distortion temperature at 0.455 mPa of at least 205° C.

16. The copolyetherimide according to claim 1 which has a heat distortion temperature at 0.455 mPa of at least 210° C.

17. The copolyetherimide according to claim 1 which has a temperature of transition between the brittle and ductile states of at most 30° C. as measured by ASTM method D3763.

18. The copolyetherimide according to claim 1 which has a weight average molecular weight, as determined by gel permeation chromatography relative to polystyrene standards, in the range of between about 30,000 and about 80,000.

19. A copolyetherimide having a glass transition temperature of at least 218° C., said copolyetherimide comprising structural units of the formulas (XXIV) and (XXV):

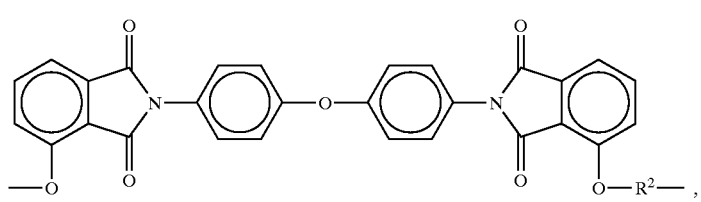
(XXIV)

wherein $R^2$ is

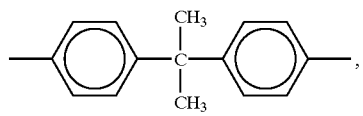

the weight ratio of units of formula (XXIV) to those of formula (XXV) being in the range of between about 99:1 and about 25:75.

20. The copolyetherimide of claim 19 further comprising structural units selected from the group consisting of those of the formula (XXVI):

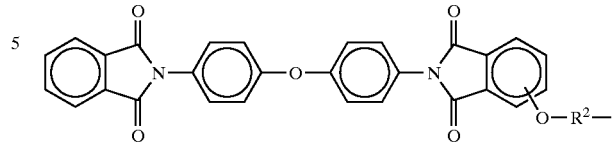
(XXVI)

wherein the unassigned positional isomer about the phthalimide ring is either in the 3-position or 4-position, and mixtures thereof.

21. The copolyetherimide of claim 19 having a viscosity value less than or approximately equal to the viscosity of a polyetherimide of comparable molecular weight derived from bisphenol A disodium salt and a 4:96 ratio of m-bis(3-chloro-N-phthalimido)benzene and m-bis(4-chloro-N-phthalimido)benzene, said viscosity determined at 380° C. and 1000 s$^{-1}$.

22. A copolyetherimide having a glass transition temperature of at least 218° C., said copolyetherimide comprising structural units of the formulas (XXIV), (XXV) and (XXVII):

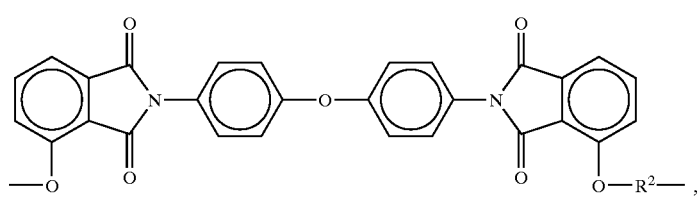
(XXIV)

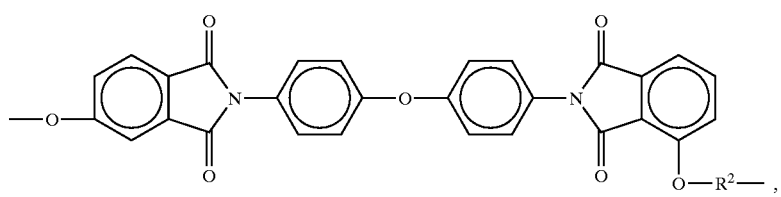
(XXV)

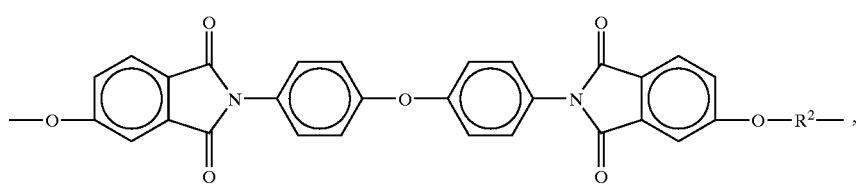
(XXVII)

wherein $R^2$ is

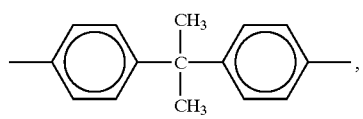

the weight ratio of units of formula (XXIV) to those of formula (XXV) being in the range of between about 99:1 and about 25:75.

23. The copolyetherimide of claim 22 further comprising structural units selected from the group consisting of those of the formula (XXVI):

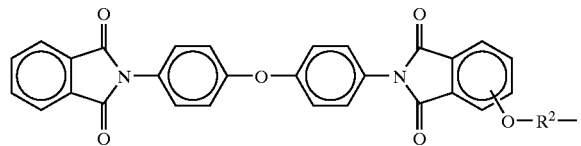

(XXVI)

wherein the unassigned positional isomer about the phthalimide ring is either in the 3-position or 4-position, and mixtures thereof.

24. The copolyetherimide of claim 22 having a viscosity value less than or approximately equal to the viscosity of a polyetherimide of comparable molecular weight derived from bisphenol A disodium salt and a 4:96 ratio of m-bis(3-chloro-N-phthalimido)benzene and m-bis(4-chloro-N-phthalimido)benzene, said viscosity determined at 380° C. and 1000 s$^{-1}$.

25. A copolyetherimide having a glass transition temperature of at least 218° C., said copolyetherimide comprising structural units of the formulas (I) and (III):

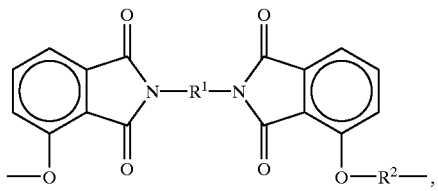

(I)

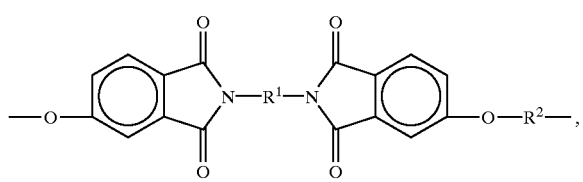

(III)

wherein $R^1$ comprises an unsubstituted $C_{6-22}$ divalent aromatic hydrocarbon or a substituted $C_{6-22}$ divalent aromatic hydrocarbon comprising halogen or alkyl substituents or mixtures of said substituents; or a divalent radical of the general formula (IV):

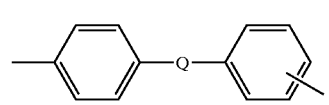

(IV)

wherein the unassigned positional isomer about the aromatic ring is either meta or para to Q, and Q is a covalent bond or a member selected from the group consisting of formulas (V):

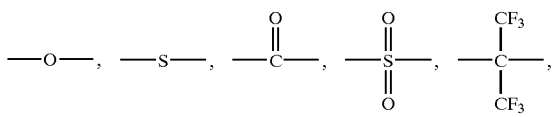

(V)

and an alkylene or alkylidene group of the formula $C_yH_{2y}$, wherein y is an integer from 1 to 5 inclusive, and $R^2$ is derived from at least one dihydroxy-substituted aromatic hydrocarbon of the formula (VI):

HO—D—OH         (VI)

wherein D has the structure of formula (VII):

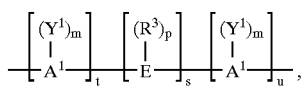

(VII)

wherein $A^1$ represents an aromatic group;
E comprises a sulfur-containing linkage, sulfide, sulfoxide, sulfone; a phosphorus-containing linkage, phosphinyl, phosphonyl; an ether linkage; a carbonyl group; a tertiary nitrogen group; a silicon-containing linkage; silane; siloxy; a cycloaliphatic group; cyclopentylidene, 3,3,5-trimethylcyclopentylidene, cyclohexylidene, 3,3-dimethylcyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene; an alkylene or alkylidene group, which group may optionally be part of one or more fused rings attached to one or more aromatic groups bearing one hydroxy substituent; an unsaturated alkylidene group; or two or more alkylene or alkylidene groups connected by a moiety different from alkylene or alkylidene and selected from the group consisting of an aromatic linkage, a tertiary nitrogen linkage; an ether linkage; a carbonyl linkage; a silicon-containing linkage, silane, siloxy; a sulfur-containing linkage, sulfide, sulfoxide, sulfone; a phosphorus-containing linkage, phosphinyl, and phosphonyl;
$R^3$ represents hydrogen; a monovalent hydrocarbon group, alkenyl, allyl, alkyl, aryl, aralkyl, alkaryl, or cycloalkyl;
$Y^1$ independently at each occurrence is selected from the group consisting of an inorganic atom, a halogen; an inorganic group, a nitro group; an organic group, a monovalent hydrocarbon group, alkenyl, allyl, alkyl, aryl, aralkyl, alkaryl, cycloalkyl, and an alkoxy group;
the letter "m" represents any integer from and including zero through the number of positions on $A^1$ available for substitution;

the letter "p" represents an integer from and including zero through the number of positions on E available for substitution;

the letter "t" represents an integer equal to at least one;

the letter "s" represents an integer equal to either zero or one; and the letter "u" represents an integer equal to at least one, and wherein the weight ratio of units of formula I to those of formula III is in the range of between about 99.9:0.1 and about 10:90.

26. The copolyetherimide according to claim 25 having a Tg greater than about 218° C.

27. The copolyetherimide according to claim 25 wherein $R^1$ is derived from at least one diamine selected from the group consisting of meta-phenylenediamine; para-phenylenediamine; 2-methyl-4,6-diethyl-1,3-phenylene-diamine; 5-methyl-4,6-diethyl-1,3-phenylenediamine; bis(4-aminophenyl)-2,2-propane; bis(2-chloro-4-amino-3,5-diethylphenyl)methane, 4,4'-diaminodiphenyl, 3,4'-diaminodiphenyl, 4,4'-diaminodiphenyl ether, 3,4'-diaminodiphenyl ether, 4,4'-diaminodiphenyl sulfone, 3,4'-diaminodiphenyl sulfone, 4,4'-diaminodiphenyl ketone, 3,4'-diaminodiphenyl ketone, 2,4-toluenediamine; and mixtures thereof.

28. The copolyetherimide of claim 25 wherein $R^2$ structural units in each of formulas (I) and (III) is the same.

29. The copolyetherimide of claim 25 wherein at least a portion of $R^2$ structural units in formulas (I) and (III) is not the same.

30. The copolyetherimide according to claim 25 wherein $R^2$ is derived from at least one dihydroxy-substituted aromatic hydrocarbon selected from the group consisting of 4,4'-(cyclopentylidene)diphenol; 4,4'-(3,3,5-trimethylcyclopentylidene)diphenol; 4,4'-(cyclohexylidene)diphenol; 4,4'-(3,3-dimethylcyclohexylidene)diphenol; 4,4'-(3,3,5-trimethylcyclohexylidene)diphenol; 4,4'-(methylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenyl-methane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(4-hydroxyphenyl)propane; 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; 2,2-bis-(4-hydroxyphenyl)butane; 2,2-bis-(4-hydroxyphenyl)-2-methylbutane; 1,1-bis-(4-hydroxyphenyl)cyclohexane; bis-(4-hydroxyphenyl); bis-(4-hydroxyphenyl)sulphide; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl)propane; bis-(3,5-dimethylphenyl-4-hydroxyphenyl)methane; 1,1-bis-(3,5-dimethylphenyl-4-hydroxyphenyl]ethane; 2,2-bis-(3,5-dimethylphenyl-4-hydroxyphenyl)propane; 2,4-bis-(3,5-dimethylphenyl-4-hydroxyphenyl)-2-methylbutane; 3,3-bis-(3,5-dimethylphenyl-4-hydroxyphenyl)pentane; 1,1-bis-(3,5-dimethylphenyl-4-hydroxyphenyl)cyclopentane; 1,1-bis-(3,5-dimethylphenyl-4-hydroxyphenyl)cyclohexane; bis-(3,5-dimethylphenyl-4-hydroxyphenyl)sulphide, 3-(4-hydroxyphenyl)-1,1,3-trimethylindan-5-ol, 1-(4-hydroxyphenyl)-1,3,3-trimethylindan-5-ol, 2,2,2',2'-tetrahydro-3,3,3',3'-tetramethyl-1,1-spirobi[1H-indene]-6,6'-diol, and mixtures thereof.

31. The copolyetherimide according to claim 25 wherein $R^2$ is derived from at least one dihydroxy-substituted aromatic hydrocarbon selected from the group consisting of those of the formula (IX):

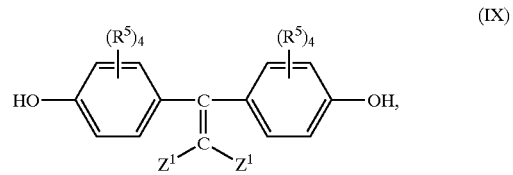

where independently each $R^5$ is hydrogen, chlorine, bromine or a $C_{1-30}$ monovalent hydrocarbon or hydrocarbonoxy group, each $Z^1$ is hydrogen, chlorine or bromine, subject to the provision that at least one $Z^1$ is chlorine or bromine; and those of the formula (X):

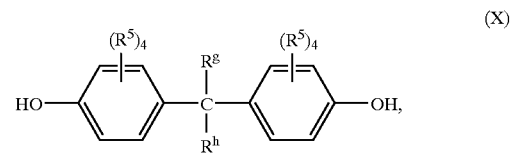

where independently each $R^5$ is as defined hereinbefore, and independently $R_g$ and $R_h$ are hydrogen or a $C_{1-30}$ hydrocarbon group.

32. The copolyetherimide according to claim 31 wherein $R^2$ is derived from bisphenol A.

33. The copolyetherimide according to claim 25 further comprising structural units derived from at least one chain termination agent.

34. The copolyetherimide according to claim 33 wherein the chain termination agent is at least one unsubstituted or substituted member selected from the group consisting of alkyl halides, alkyl chlorides, aryl halides, aryl chlorides, and chlorides of formulas (XVII) and (XVIII):

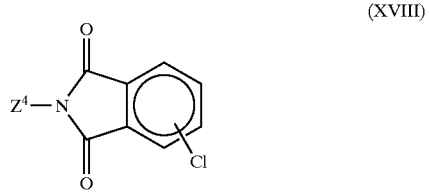

wherein the chlorine substituent is in the 3- or 4-position, and $Z^3$ and $Z^4$ comprise a substituted or unsubstituted alkyl or aryl group.

35. The copolyetherimide according to claim 33 wherein the chain termination agent is at least one member selected from the group consisting of monochlorobenzophenone, monochlorodiphenylsulfone; a monochlorophthalimide;

4-chloro-N-methylphthalimide, 4-chloro-N-butylphthalimide, 4-chloro-N-octadecylphthalimide, 3-chloro-N-methylphthalimide, 3-chloro-N-butylphthalimide, 3-chloro-N-octadecylphthalimide, 4-chloro-N-phenylphthalimide, 3-chloro-N-phenylphthalimide; a mono-substituted bis-phthalimide; a monochlorobisphthalimidobenzene; 1-[N-(4-chlorophthalimido)]-3-(N-phthalimido)benzene; 1-[N-3-chlorophthalimido)]-3-(N-phthalimido)benzene; monochlorobisphthalimidodiphenyl sulfone, monochlorobisphthalimidodiphenyl ketone, a monochlorobisphthalimidophenyl ether; 4-[N-(4-chlorophthalimido)]phenyl-4'-(N-phthalimido)phenyl ether, 4-[N-(3-chlorophthalimido)phenyl]4'-(N-phthalimido)phenyl ether, and the corresponding isomers of the latter two compounds derived from 3,4'-diaminodiphenyl ether.

36. The copolyetherimide according to claim 25 wherein the weight ratio of units of formula I to those of formula II is in the range of between about 99:1 and about 20:80.

37. The copolyetherimide according to claim 25 which has a heat distortion temperature at 0.455 mPa of at least 205° C.

38. The copolyetherimide according to claim 25 which has a heat distortion temperature at 0.455 mPa of at least 210° C.

39. The copolyetherimide according to claim 25 which has a temperature of transition between the brittle and ductile states of at most 30° C. as measured by ASTM method D3763.

40. The copolyetherimide according to claim 25 which has a weight average molecular weight, as determined by gel permeation chromatography relative to polystyrene standards, in the range of between about 30,000 and about 80,000.

41. A copolyetherimide having a glass transition temperature of at least 218° C., said copolyetherimide comprising structural units of the formulas (XXIV) and (XXVII):

42. The copolyetherimide of claim 41 further comprising structural units selected from the group consisting of those of the formula (XXVI):

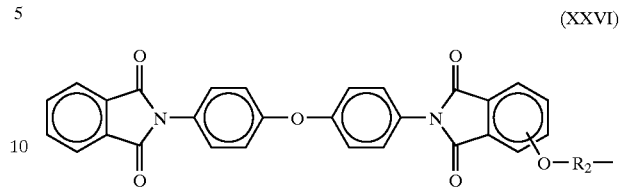

(XXVI)

wherein the unassigned positional isomer about the phthalimide ring is either in the 3-position or 4-position, and mixtures thereof.

43. The copolyetherimide of claim 41 having a viscosity value less than or approximately equal to the viscosity of a polyetherimide of comparable molecular weight derived from bisphenol A disodium salt and a 4:96 ratio of m-bis(3-chloro-N-phthalimido)benzene and m-bis(4-chloro-N-phthalimido)benzene, said viscosity determined at 380° C. and 1000 $s^{-1}$.

44. A copolyetherimide having a glass transition temperature of at least about 218° C., said copolyetherimide comprising structural units of the formulas (I) and (VIII):

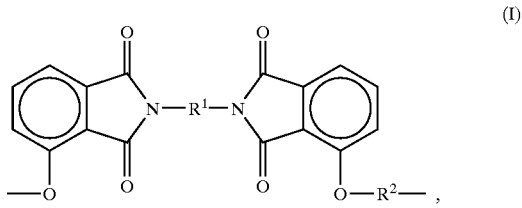

(I)

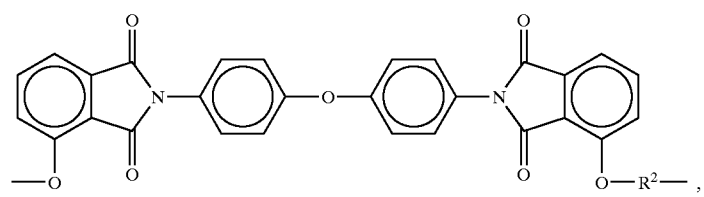

(XXIV)

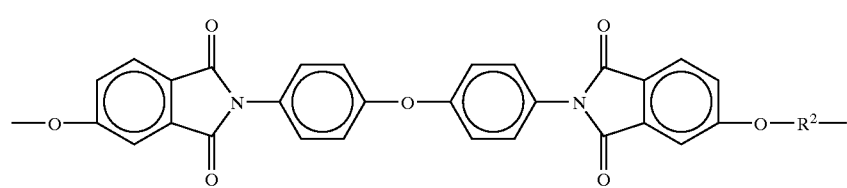

(XXVII)

wherein $R^2$ is

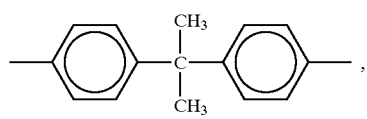

the weight ratio of units of formula (XXIV) to those of formula (XXVII) being in the range of between about 99:1 and about 25:75.

-continued

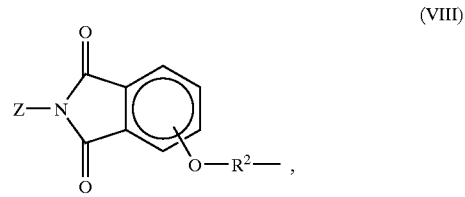

(VIII)

wherein R¹ comprises an unsubstituted $C_{6-22}$ divalent aromatic hydrocarbon or a substituted $C_{6-22}$ divalent aromatic hydrocarbon comprising halogen or alkyl substituents or mixtures of said substituents; or a divalent radical of the general formula (IV):

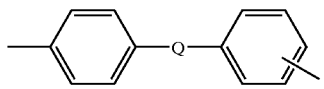

(IV)

wherein the unassigned positional isomer about the aromatic ring is either meta or para to Q, and Q is a covalent bond or a member selected from the group consisting of formulas (V):

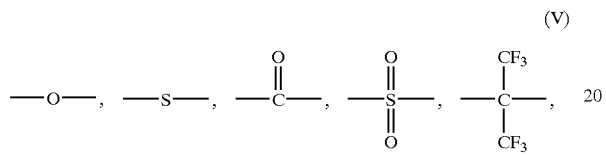

(V)

and an alkylene or alkylidene group of the formula $C_yH_{2-y}$, wherein y is an integer from 1 to 5 inclusive, and R² is a divalent aromatic radical; wherein formula (VIII) is a terminal group with Z selected from the group consisting of unsubstituted and substituted alkyl, and unsubstituted and substituted aryl, and wherein the copolyetherimide has a weight average molecular weight, as determined by gel permeation chromatography relative to polystyrene standards, in the range of between about 30,000 and about 80,000, with a polydispersity in a range of between about 2.3 and about 3.

45. The copolyetherimide according to claim 44 having a Tg greater than about 218° C.

46. The copolyetherimide according to claim 44 wherein R¹ is derived from at least one diamine selected from the group consisting of meta-phenylenediamine; para-phenylenediamine; 2-methyl-4,6-diethyl-1,3-phenylenediamine; 5-methyl-4,6-diethyl-1,3-phenylenediamine; bis(4-aminophenyl)-2,2-propane; bis(2-chloro-4-amino-3,5-diethylphenyl)methane, 4,4'-diaminodiphenyl, 3,4'-diaminodiphenyl, 4,4'-diaminodiphenyl ether, 3,4'diaminodiphenyl ether, 4,4'-diaminodiphenyl sulfone, 3,4'-diaminodiphenyl sulfone, 4,4'-diaminodiphenyl ketone, 3,4'-diaminodiphenyl ketone, 2,4-toluenediamine; and mixtures thereof.

47. The copolyetherimide according to claim 44 wherein structural units of formula (VIII) are derived from at least one member selected from the group consisting of a monochlorophthalimide; 4-chloro-N-methylphthalimide, 4-chloro-N-butylphthalimide, 4-chloro-N-octadecyl-phthalimide, 3-chloro-N-methylphthalimide, 3-chloro-N-butylphthalimide, 3-chloro-N-octadecylphthalimide, 4-chloro-N-phenylphthalimide, 3-chloro-N-phenylphthalimide; a mono-substituted bis-phthalimide; a monochlorobisphthalimidobenzene; 1-[N-(4-chlorophthalimido)]-3-(N-phthalimido)benzene; 1-[N-(3-chlorophthalimido)]-3-(N-phthalimido)benzene; monochlorobisphthalimidodiphenyl sulfone, monochlorobisphthalimidodiphenyl ketone, a monochlorobisphthalimidophenyl ether, 4-[N-(4-chlorophthalimido)]phenyl-4'-(N-phthalimido)phenyl ether; 4-[N-(3-chlorophthalimido)phenyl]4'-(N-phthalimido)phenyl ether, and the corresponding isomers of the latter two compounds derived from 3,4'-diaminodiphenyl ether.

48. The copolyetherimide according to claim 44 wherein R² is derived from at least one dihydroxy-substituted aromatic hydrocarbon of the formula (VI):

(VI)

wherein D has the structure of formula (VII):

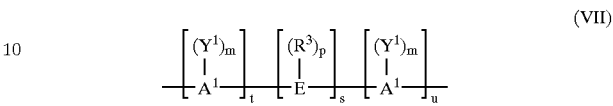

(VII)

wherein A¹ represents an aromatic group;

E comprises a sulfur-containing linkage, sulfide, sulfoxide, sulfone; a phosphorus-containing linkage, phosphinyl, phosphonyl; an ether linkage; a carbonyl group; a tertiary nitrogen group; a silicon-containing linkage; silane; siloxy; a cycloaliphatic group; cyclopentylidene, 3,3,5-trimethylcyclopentylidene, cyclohexylidene, 3,3-dimethylcyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene; an alkylene or alkylidene group, which group may optionally be part of one or more fused rings attached to one or more aromatic groups bearing one hydroxy substituent; an unsaturated alkylidene group; or two or more alkylene or alkylidene groups connected by a moiety different from alkylene or alkylidene and selected from the group consisting of an aromatic linkage, a tertiary nitrogen linkage; an ether linkage; a carbonyl linkage; a silicon-containing linkage, silane, siloxy; a sulfur-containing linkage, sulfide, sulfoxide, sulfone; a phosphorus-containing linkage, phosphinyl, and phosphonyl;

R³ comprises hydrogen; a monovalent hydrocarbon group, alkenyl, allyl, alkyl, aryl, aralkyl, alkaryl, or cycloalkyl;

Y¹ independently at each occurrence is selected from the group consisting of an inorganic atom, a halogen; an inorganic group, a nitro group; an organic group, a monovalent hydrocarbon group, alkenyl, allyl, alkyl, aryl, aralkyl, alkaryl, cycloalkyl, and an alkoxy group;

the letter "m" represents any integer from and including zero through the number of positions on A¹ available for substitution;

the letter "p" represents an integer from and including zero through the number of positions on E available for substitution;

the letter "t" represents an integer equal to at least one;

the letter "s" represents an integer equal to either zero or one; and "u" represents any integer including zero.

49. The copolyetherimide of claim 48 wherein R² structural units in each of formulas (I) and (VIII) are the same.

50. The copolyetherimide of claim 48 wherein at least a portion of R² structural units in each of formulas (I) and (VIII) are not the same.

51. The copolyetherimide according to claim 44 wherein R² is derived from at least one dihydroxy-substituted aromatic hydrocarbon selected from the group consisting of 4,4'-(cyclopentylidene)diphenol; 4,4'-(3,3,5-trimethylcyclopentylidene)diphenol; 4,4'-(cyclohexylidene)diphenol; 4,4'-(3,3-dimethylcyclohexylidene)diphenol; 4,4'-(3,3,5-trimethylcyclohexylidene)diphenol; 4,4'-(methylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl) methane; bis(4-hydroxy-5-nitrophenyl)methane; bis(4-hydroxy-2,6-dimethyl-3-methoxyphenyl)methane; 1,1-bis (4-hydroxyphenyl)ethane; 1,2-bis(4-hydroxyphenyl)ethane; 1,1-bis(4-hydroxy-2-chlorophenyl)ethane; 2,2-bis(4-hydroxyphenyl)propane; 2,2-bis(3-phenyl-4-hydroxyphenyl)propane; 2,2-bis(4-hydroxy-3-methylphenyl)propane; 2,2-bis(4-hydroxy-3-ethylphenyl) propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene, 2,6-dihydroxy naphthalene; hydroquinone; resorcinol; $C_{1-3}$ alkyl-substituted resorcinols; 2,2-bis-(4-hydroxyphenyl)butane; 2,2-bis-(4-hydroxyphenyl)-2-methylbutane; 1,1-bis-(4-hydroxyphenyl)cyclohexane; bis-(4-hydroxyphenyl); bis-(4-hydroxyphenyl)sulphide; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl) propane; bis-(3,5-dimethylphenyl-4-hydroxyphenyl) methane; 1,1-bis-(3,5-dimethylphenyl-4-hydroxyphenyl) ethane; 2,2-bis-(3,5-dimethylphenyl-4-hydroxyphenyl) propane; 2,4-bis-(3,5-dimethylphenyl-4-hydroxyphenyl)-2-methylbutane; 3,3-bis-(3,5-dimethylphenyl-4-t hydroxyphenyl)pentane; 1,1-bis-(3,5-dimethylphenyl-4-hydroxyphenyl)cyclopentane; 1,1-bis-(3,5-dimethylphenyl-hydroxyphenyl)cyclohexane; bis-(3,5-dimethylphenyl-4-hydroxyphenyl)sulphide, 3-(4-hydroxyphenyl)-1,1,3-trimethylindan-5-ol, 1-(4-hydroxyphenyl)-1,3,3-trimethylindan-5-ol, 2,2,2',2'-tetrahydro-3,3,3',3'-tetramethyl-1,1'-spirobi[1H-indene]-6,6'-diol, and mixtures thereof.

52. The copolyetherimide according to claim 44 wherein $R^2$ is derived from at least one dihydroxy-substituted aromatic hydrocarbon selected from the group consisting of those of the formula (IX):

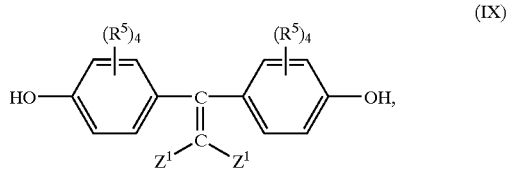

(IX)

where independently each $R^5$ is hydrogen, chlorine, bromine or a $C_{1-30}$ monovalent hydrocarbon or hydrocarbonoxy group, each $Z^1$ is hydrogen, chlorine or bromine, subject to the provision that at least one $Z^1$ is chlorine or bromine; and those of the formula (X):

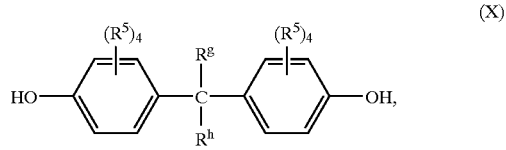

(X)

where independently each $R^5$ is as defined hereinbefore, and independently $R^g$ and $R^h$ are hydrogen or a $C_{1-30}$ hydrocarbon group.

53. The copolyetherimide according to claim 52 wherein $R^2$ is derived from bisphenol A.

54. The copolyetherimide according to claim 44 which has a heat distortion temperature at 0.455 mPa of at least 205° C.

55. The copolyetherimide according to claim 44 which has a heat distortion temperature at 0.455 mPa of at least 210° C.

56. The copolyetherimide according to claim 44 which has a temperature of transition between the brittle and ductile states of at most 30° C. as measured by ASTM method D3763.

57. The copolyetherimide according to claim 44 which has a weight average molecular weight, as determined by gel permeation chromatography relative to polystyrene standards, in the range of between about 30,000 and about 80,000.

58. A copolyetherimide having a glass transition temperature of at least 218° C., said copolyetherimide comprising structural units of the formula (XXIV)

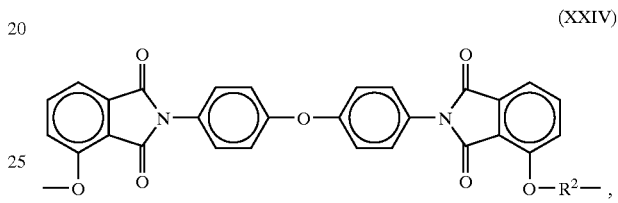

(XXIV)

and structural units selected from the group consisting of those of the formula (XXVI):

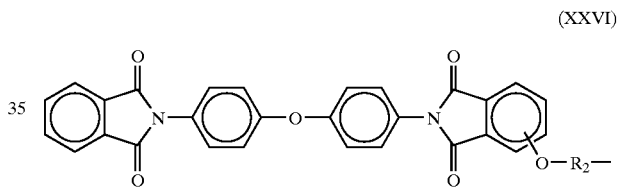

(XXVI)

wherein the unassigned positional isomer about the phthalimide ring is either in the 3-position or 4-position, and mixtures thereof,
and wherein $R^2$ is

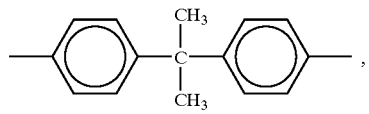

and wherein the copolyetherimide has a weight average molecular weight, as determined by gel permeation chromatography relative to polystyrene standards, in the range of between about 30,000 and about 80,000, with a polydispersity in a range of between about 2.4 and about 2.8.

59. The copolyetherimide of claim 58 having a viscosity value less than or approximately equal to the viscosity of a polyetherimide of comparable molecular weight derived from bisphenol A disodium salt and 4:96 ratio of m-bis(3-chloro-N-phthalimido)benzene and m-bis(4-chloro-N-phthalimido)benzene, said viscosity determined at 380° C. and 1000 $s^{-1}$.

60. An article comprising the copolyetherimide of claim 1.

61. The article of claim 60 further comprising at least one additive selected from the group consisting of antioxidants, flame retardants, drip retardants, UV blockers, nucleating agents, dyes, pigments, colorants, blowing agents, reinforcing agents, fillers, particulate fillers, reinforcing fillers, glass fibers, E-glass, A-glass, C-glass, ECR-glass, R-glass, S-glass, D-glass, NE-glass, quartz, carbon fibers, carbon microfibers, potassium titanate fibers, gypsum fibers, aluminum oxide fibers, aluminum silicate fibers, magnesium oxide fibers, conductive fillers, glass beads, hollow glass beads, chalks, micas, talcs, natural kaolins, calcined kaolins, stabilizers, antistatic agents, processing aids, plasticizers, mold release agents, lubricants and mixtures thereof.

62. An article comprising the copolyetherimide of claim 19.

63. The article of claim 62 further comprising at least one additive selected from the group consisting of antioxidants, flame retardants, drip retardants, UV blockers, nucleating agents, dyes, pigments, colorants; blowing agents, reinforcing agents, fillers, particulate fillers, reinforcing fillers, glass fibers, E-glass, A-glass, C-glass, ECR-glass, R-glass, S-glass, D-glass, NE-glass, quartz, carbon fibers, carbon microfibers, potassium titanate fibers, gypsum fibers, aluminum oxide fibers, aluminum silicate fibers, magnesium oxide fibers, conductive fillers, glass beads, hollow glass beads, chalks, micas, talcs, natural kaolins, calcined kaolins, stabilizers, antistatic agents, processing aids, plasticizers, mold release agents, lubricants and mixtures thereof.

64. An article comprising the copolyetherimide of claim 22.

65. The article of claim 64 further comprising at least one additive selected from the group consisting of antioxidants, flame retardants, drip retardants, UV blockers, nucleating agents, dyes, pigments, colorants, blowing agents, reinforcing agents, fillers, particulate fillers, reinforcing fillers, glass fibers, E-glass, A-glass, C-glass, ECR-glass, R-glass, S-glass, D-glass, NE-glass, quartz, carbon fibers, carbon microfibers, potassium titanate fibers, gypsum fibers, aluminum oxide fibers, aluminum silicate fibers, magnesium oxide fibers, conductive fillers, glass beads, hollow glass, beads, chalks, micas, talcs, natural kaolins, calcined kaolins, stabilizers, antistatic agents, processing aids, plasticizers, mold release agents, lubricants and mixtures thereof.

66. An article comprising the copolyetherimide of claim 25.

67. The article of claim 66 further comprising at least one additive selected from the group consisting of antioxidants, flame retardants, drip retardants, UV blockers, nucleating agents, dyes, pigments, colorants, blowing agents, reinforcing agents, fillers, particulate fillers, reinforcing fillers, glass fibers, E-glass, A-glass, C-glass, ECR-glass, R-glass, S-glass, D-glass, NE-glass, quartz, carbon fibers, carbon microfibers, potassium titanate fibers, gypsum fibers, aluminum oxide fibers, aluminum silicate fibers, magnesium oxide fibers, conductive fillers, glass beads, hollow glass beads, chalks, micas, talcs, natural kaolins, calcined kaolins, stabilizers, antistatic agents, processing aids, plasticizers, mold release agents, lubricants and mixtures thereof.

68. An article comprising the copolyetherimide of claim 41.

69. The article of claim 68 further comprising at least one additive selected from the group consisting of antioxidants, flame retardants, drip retardants, UV blockers, nucleating agents, dyes, pigments, colorants, blowing agents, reinforcing agents, fillers, particulate fillers, reinforcing fillers, glass fibers, E-glass, A-glass, C-glass, ECR-glass, R-glass, S-glass, D-glass, NE-glass, quartz, carbon fibers, carbon microfibers, potassium titanate fibers, gypsum fibers, aluminum oxide fibers, aluminum silicate fibers, magnesium oxide fibers, conductive fillers, glass beads, hollow glass beads, chalks, micas, talcs, natural kaolins, calcined kaolins, stabilizers, antistatic agents, processing aids, plasticizers, mold release agents, lubricants and mixtures thereof.

70. An article comprising the copolyetherimide of claim 44.

71. The article of claim 70 further comprising at least one additive selected from the group consisting of antioxidants, flame retardants, drip retardants, UV blockers, nucleating agents, dyes, pigments, colorants, blowing agents, reinforcing agents, fillers, particulate fillers, reinforcing fillers, glass fibers, E-glass, A-glass, C-glass, ECR-glass, R-glass, S-glass, D-glass, NE-glass, quartz, carbon fibers, carbon microfibers, potassium titanate fibers, gypsum fibers, aluminum oxide fibers, aluminum silicate fibers, magnesium oxide fibers, conductive fillers, glass beads, hollow glass beads, chalks, micas, talcs, natural kaolins, calcined kaolins, stabilizers, antistatic agents, processing aids, plasticizers, mold release agents, lubricants and mixtures thereof.

72. An article comprising the copolyetherimide of claim 58.

73. The article of claim 72 further comprising at least one additive selected from the group consisting of antioxidants, flame retardants, drip retardants, UV blockers, nucleating agents, dyes, pigments, colorants, blowing agents, reinforcing agents, fillers, particulate fillers, reinforcing fillers, glass fibers, E-glass, A-glass, C-glass, ECR-glass, R-glass, S-glass, D-glass, NE-glass, quartz, carbon fibers, carbon microfibers, potassium titanate fibers, gypsum fibers, aluminum oxide fibers, aluminum silicate fibers, magnesium oxide fibers, conductive fillers, glass beads, hollow glass beads, chalks, micas, talcs, natural kaolins, calcined kaolins, stabilizers, antistatic agents, processing aids, plasticizers, mold release agents, lubricants and mixtures thereof.

* * * * *